(12) United States Patent
Yokouchi et al.

(10) Patent No.: US 8,814,244 B2
(45) Date of Patent: Aug. 26, 2014

(54) ACCOMMODATION STRUCTURE FOR SADDLE TYPE VEHICLE

(71) Applicant: Honda Motor Co., Ltd., Tokyo (JP)

(72) Inventors: Kohei Yokouchi, Wako (JP); Tomoyuki Maruyama, Wako (JP); Michio Atsuchi, Wako (JP); Yoji Komatsu, Wako (JP); Takasumi Yamanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/790,652

(22) Filed: Mar. 8, 2013

(65) Prior Publication Data

US 2013/0249233 A1    Sep. 26, 2013

(30) Foreign Application Priority Data

Mar. 22, 2012  (JP) ................................. 2012-064851
Sep. 25, 2012  (JP) ................................. 2012-210981

(51) Int. Cl.
*B60R 7/00* (2006.01)

(52) U.S. Cl.
USPC ...................................................... 296/37.15

(58) Field of Classification Search
CPC .... B62K 2202/00; B62K 19/46; B64D 11/00; B65D 5/5035; B65D 5/0281
USPC .......................... 296/37.15, 37.1, 24.34, 24.3
See application file for complete search history.

(56) References Cited

U.S. PATENT DOCUMENTS

| | | | | |
|---|---|---|---|---|
| 7,298,241 | B2 * | 11/2007 | Konno et al. ................ | 340/5.64 |
| 2012/0175906 | A1 * | 7/2012 | Hiwatashi .................... | 296/37.1 |
| 2013/0105240 | A1 * | 5/2013 | Tsai et al. .................... | 180/219 |
| 2013/0247881 | A1 * | 9/2013 | Okubo et al. ................ | 123/519 |
| 2013/0249186 | A1 * | 9/2013 | Maruyama et al. .......... | 280/274 |
| 2013/0249238 | A1 * | 9/2013 | Yokouchi et al. .......... | 296/180.1 |
| 2013/0249239 | A1 * | 9/2013 | Yokouchi et al. .......... | 296/180.1 |
| 2013/0320696 | A1 * | 12/2013 | Yokouchi et al. ............... | 296/75 |
| 2013/0320697 | A1 * | 12/2013 | Yokouchi et al. ............ | 296/78.1 |
| 2014/0060945 | A1 * | 3/2014 | Atsuchi et al. ............... | 180/68.5 |
| 2014/0061268 | A1 * | 3/2014 | Ibaraki et al. ................ | 224/413 |
| 2014/0062119 | A1 * | 3/2014 | Yokouchi et al. ............ | 296/35.3 |
| 2014/0063825 | A1 * | 3/2014 | Nakamura et al. ............ | 362/473 |

FOREIGN PATENT DOCUMENTS

JP        6-156344 A      6/1994

* cited by examiner

*Primary Examiner* — Kiran B Patel
(74) *Attorney, Agent, or Firm* — Birch, Stewart, Kolasch & Birch, LLP

(57) ABSTRACT

An accommodation structure for a saddle type vehicle wherein the accommodation space can be expanded by a simple and easy configuration. An opening is provided in a rear wall of an accommodation box that is opened and closed by an occupant's seat. Further, a sub-accommodation box is provided that is in the form of a box open in a forward direction and is mounted so as to close up the opening and be swollen rearwardly farther than the opening.

20 Claims, 19 Drawing Sheets

ACCOMMODATION STRUCTURE FOR SADDLE TYPE VEHICLE

CROSS-REFERENCE TO RELATED APPLICATIONS

The present application claims priority under 35 USC 119 to Japanese Patent Application No. 2012-210981 filed Sep. 25, 2012 and Japanese Patent Application No. 2012-064851 filed Mar. 22, 2012 the entire contents of which are hereby incorporated by reference.

BACKGROUND OF THE INVENTION

1. Field of the Invention

The present invention relates to an accommodation structure for a saddle type vehicle that includes an accommodation box provided below a seat for an occupant and open upwardly.

2. Description of Background Art

A saddle type vehicle such as a motorcycle is known that includes an accommodation box provided below a seat for an occupant and open upwardly. A vehicle of this type is described in Japanese Patent Laid-Open No. Hei 6-156344. More particularly, an attachment plate for attaching a battery is provided in a projecting manner on an upper face of a rear fender behind the accommodation box with a battery being disposed behind a rear wall of the accommodation box. Further, an opening for maintenance such as an exchange or the like of the battery is provided in the rear wall of the accommodation box.

However, according to the conventional configuration, an attachment plate for attaching a battery is provided separately behind the accommodation box. In addition, a battery that is an accommodation article is held using a holding tool. Therefore, although the accommodation space can be expanded, the number of parts increases and also the structure is complicated.

SUMMARY AND OBJECTS OF THE INVENTION

The present invention has been made in view of such a situation as described above, and it is an object of an embodiment of the present invention to provide an accommodation structure for a saddle type vehicle wherein the accommodation space can be expanded by a simple and easy configuration.

In order to solve the problem described above, according to an embodiment of the present invention, there is provided an accommodation structure for a saddle type vehicle wherein an accommodation box (44) open upwardly is provided below an occupant's seat (10) and opened and closed by the occupant's seat (10), and an opening (44K) is provided in a rear wall (44R) of the accommodation box (44), wherein a sub-accommodation section (671) is provided that is in the form of a box open in a forward direction and is mounted so as to close up the opening (44K) and be swollen rearwardly farther than the opening (44K).

With this configuration, the sub-accommodation box is provided that is in the form of a box open in a forward direction and is mounted so as to close up the opening of the rear wall of the accommodation box and be swollen rearwardly farther than the opening. Therefore, the accommodation space can be expanded by a simple and easy configuration and with a small number of parts.

In the configuration described above, the accommodation structure for a saddle type vehicle may be configured such that a bottom plate (671A) of the sub-accommodation section (671) has a forwardly swollen portion (671A1) that is swollen in a forward direction farther than a top plate (671B) of the sub-accommodation section (671), and a cross member (21) of a vehicle body frame (F) passes below the forwardly swollen portion (671A1) and has an identification section (95) for the identification of the vehicle provided at a position thereof wherein the identification section (95) overlaps with the forwardly swollen portion as viewed in a top plan of the vehicle body. With this configuration, if the sub-accommodation section is removed, then it becomes easy to confirm the identification section. Further, in a normal use state wherein the confirmation of the identification section is not required, the appearance is improved without exposing the identification section by the sub-accommodation section.

In the configuration described above, the accommodation structure for a saddle type vehicle may be configured such that the cross member (21) connects left and right seat rails (14) to each other at a rearmost end of the vehicle body frame (F). With this configuration, both an assurance of the accommodation space and a reduction in the length of the vehicle body frame can be achieved. Thus, a compaction and reduction in weight of the vehicle can be carried out.

Further, in the configuration described above, the accommodation structure for a saddle type vehicle may be configured such that a rear lamp unit (91) is disposed and wiring lines connected to the rear lamp unit (91) are wired behind the sub-accommodation section (671). With this configuration, while interference between loaded stuff and wiring lines and so forth is avoided by the sub-accommodation section, the accommodation space can be maximized as far as possible. Further, maintenance of a bulb of the rear lamp unit can be carried out by removing the sub-accommodation section. Thus, the necessity to provide a maintenance lid separately is eliminated.

Further, in the configuration described above, the accommodation structure for a saddle type vehicle may be configured such that a grab rail (48) configured from a pair of left and right arm portions (48A) extending in a forward direction and a connecting portion (48B) that connects the arm portions (48A) to each other and having a U-shape open in a forward direction is provided. Thus, a fastening portion (314) to the vehicle body frame (F) is provided on the paired left and right arm portions (48A), and the connecting portion (48B) is disposed behind the sub-accommodation section (671) while a seat catch (372) that configures a locking mechanism for the occupant's seat (10) is provided at a front portion of the connecting portion (48B). With this configuration, in comparison with an alternative case wherein the seat catch is attached to the vehicle body frame, compaction of the vehicle body frame and compaction in the rear of the accommodation box by the neighboring disposition of the seat catch and the sub-accommodation section can be anticipated.

Further, in the configuration described above, the accommodation structure for a saddle type vehicle may be configured such that a partition plate (662) is provided in front of the sub-accommodation section (671). With this configuration, it is possible to assure an accommodation space for accessories in a partitioned relationship from the main accommodation space of the accommodation box.

In this instance, the partition wall (662) may be formed as a bottomed accessory case open upwardly. With this configuration, the partition wall can be used as an accessory case that is good in convenience in use. Further, if the partition wall is formed as a removable partition wall, an accessory placed in the interior of the sub-accommodation section can be taken out readily by removing the accessory case.

Further, in the configuration described above, the accommodation structure for a saddle type vehicle may be configured such that a lid member (682) that openably closes up a front opening of the sub-accommodation section (671) is connected to a front upper portion of the sub-accommodation section (671) by a hinge section (681). With this configuration, the sub-accommodation section is partitioned as an independent accommodation space, and the convenience in use as an accessory case can be improved.

In an embodiment of the present invention, the sub-accommodation box is provided wherein the form of a box is open in a forward direction and is mounted so as to close up the opening of the rear wall of the accommodation box and be swollen rearwardly farther than the opening. Therefore, the accommodation space can be expanded by a simple and easy configuration and with a small number of parts.

Further, the bottom plate of the sub-accommodation section has the forwardly swollen portion that is swollen in a forward direction farther than the top plate of the sub-accommodation section. Further, the cross member of the vehicle body frame passes below the forwardly swollen portion and has the identification section for the identification of the vehicle provided at the position thereof at that the identification section that overlaps with the forwardly swollen portion as viewed in top plan of the vehicle body. If this configuration is applied, then if the sub-accommodation section is removed, then it becomes easy to confirm the identification section. Further, in a normal use state wherein continuation of the identification section is not required, the appearance is improved without exposing the identification section by the sub-accommodation section.

Where the cross member connects the left and right seat rails to each other at the rearmost end of the vehicle body frame, both an assurance of the accommodation space and a reduction in the length of the vehicle body frame can be achieved. Thus, a compaction and a reduction in weight of the vehicle can be carried out.

Further, where the rear lamp unit is disposed and the wiring lines connected to the rear lamp unit are wired behind the sub-accommodation section, while interference between loaded stuff and wiring lines and so forth is avoided by the sub-accommodation section, the accommodation space can be maximized as far as possible. Further, maintenance of a bulb of the rear lamp unit can be carried out by removing the sub-accommodation section. Thus, the necessity to provide a separate maintenance lid is eliminated.

Further, the grab rail configured from the paired left and right arm portions extend in a forward direction with the connecting portion being provided that connect the arm portions to each other with a U-shape opening in a forward direction. In addition, the fastening portion to the vehicle body frame is provided on the paired left and right arm portions. Further, the connecting portion is disposed behind the sub-accommodation section while the seat catch that configures the locking mechanism for the occupant's seat is provided at a front portion of the connecting portion. If this configuration is applied, then compaction of the vehicle body frame and compaction in the rear of the accommodation box by the neighboring disposition of the seat catch and the sub-accommodation section can be anticipated.

Further, if the partition wall is provided in front of the sub-accommodation section, then the accommodation space for the accessory case can be assured partitioning the same from the main accommodation space of the accommodation box. Further, if the partition wall is formed as a bottomed accessory case open upwardly, then the partition wall can be used as an accessory case that is good in convenience in use.

Further, the accommodation structure for a saddle type vehicle may be configured such that the lid member that openably closes up a front opening of the sub-accommodation section is connected to a front upper portion of the sub-accommodation section by a hinge section. If this configuration is applied, then the sub-accommodation section is partitioned as an independent accommodation space. Thus, the convenience in use as an accessory case can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
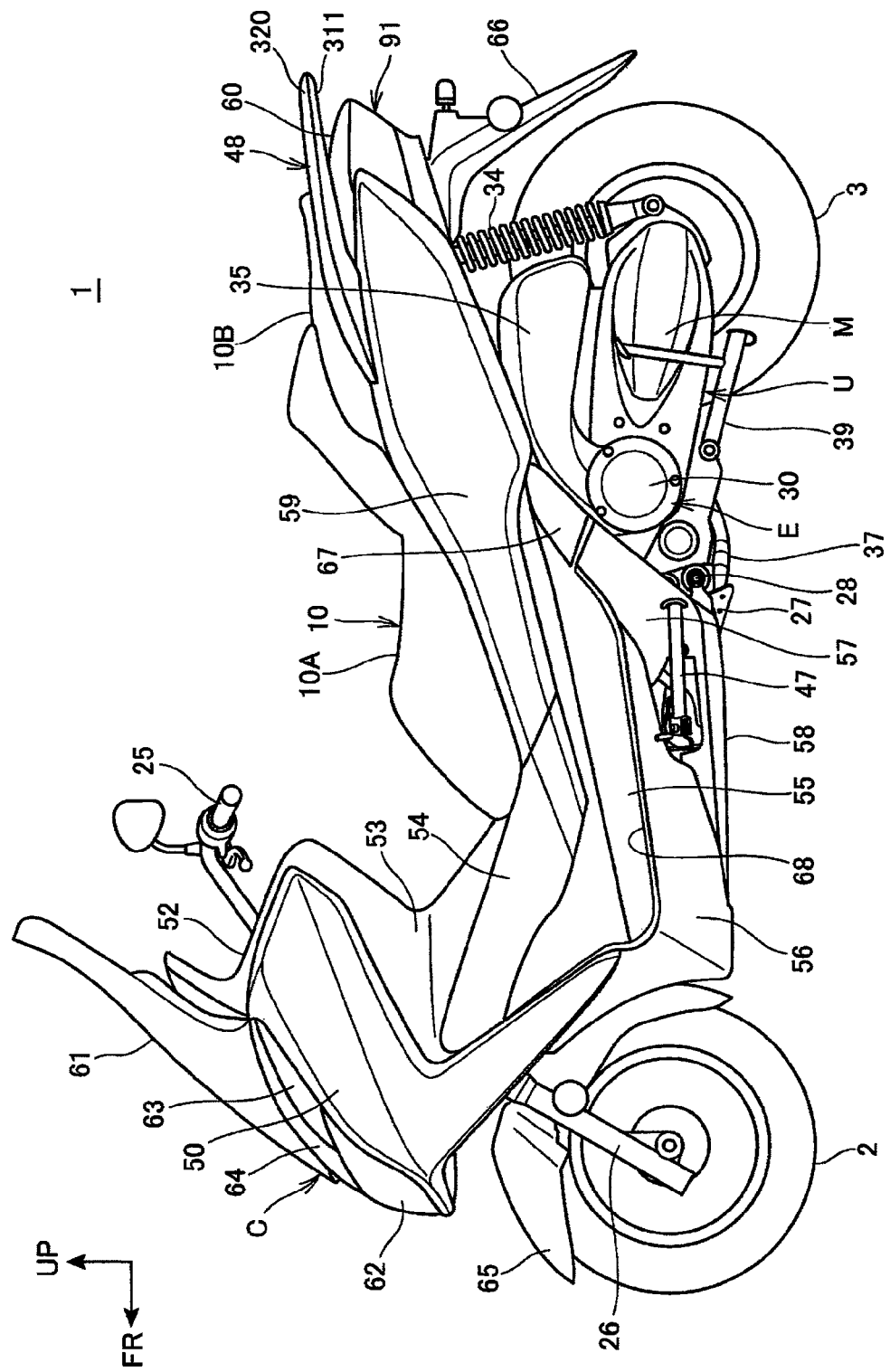
FIG. 1 is a left side elevational view of a motorcycle according to a first embodiment of the present invention.

The following embodiments of the present invention are described with reference to the drawings. It is to be noted that, unless otherwise specified, expressions of directions such as forward and rearward, leftward and rightward, and upward and downward directions are same as those taken with reference to a vehicle body. Further, in the drawings, reference character FR indicates the forward direction of the vehicle body, reference character UP indicates the upward direction of the vehicle body, and reference character LE indicates the leftward direction of the vehicle body.

FIG. 1 is a left side elevational view of a motorcycle according to a first embodiment of the present invention.

Figure 2:
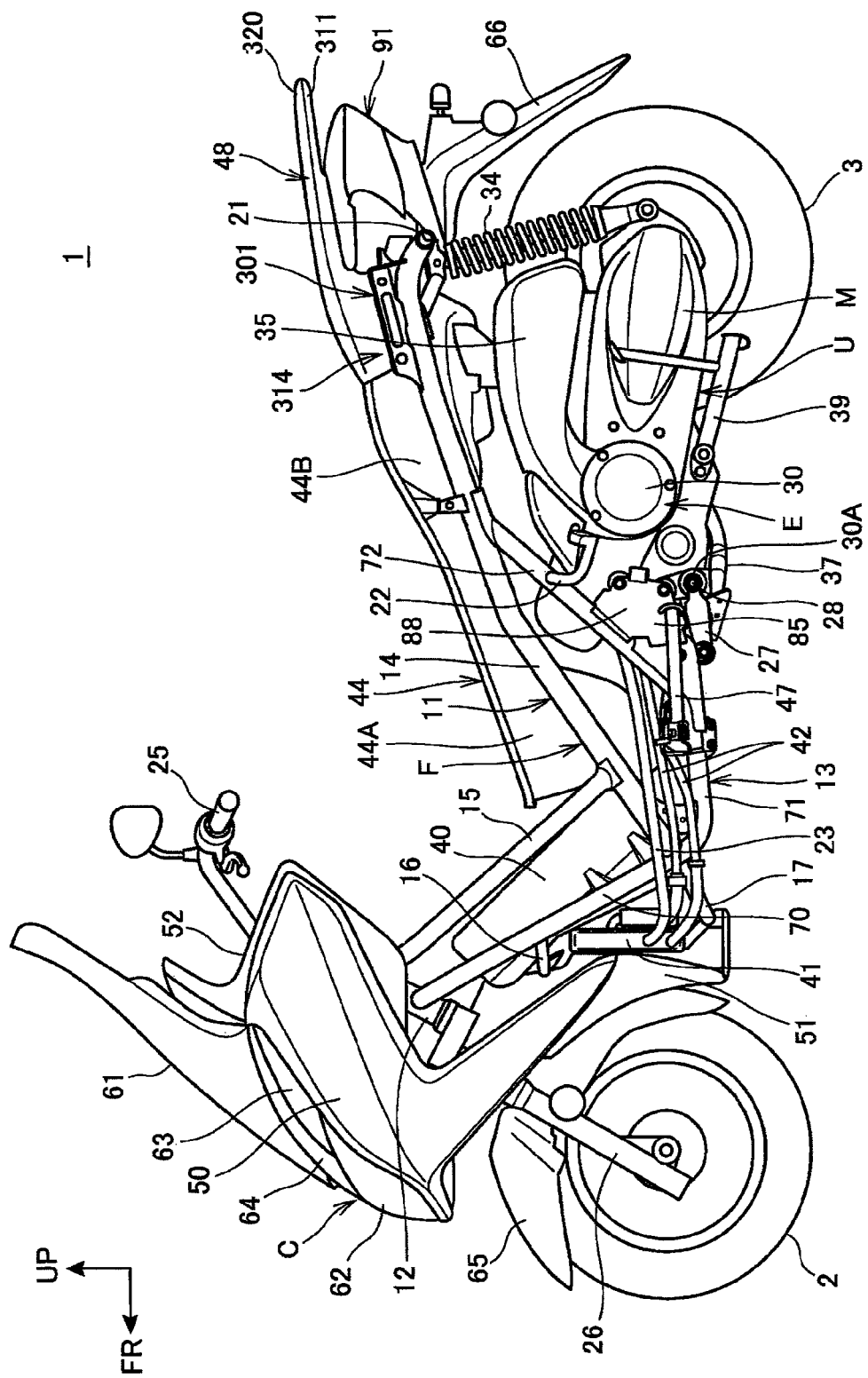
FIG. 2 is a left side elevational view showing an internal structure of the motorcycle.

The motorcycle (saddle type vehicle) 1 is a scooter type vehicle having a step floor 68 of the low floor type on which an occupant, seated on an occupant's seat (hereinafter referred to as seat) 10, is to place his/her feet. The motorcycle 1 has a front wheel 2 at a front portion of a vehicle body frame F (FIG. 2). A rear wheel 3 is a driving wheel supported for rotation on a unit swing engine U (unit swing power unit) disposed at a rear portion of the vehicle. The vehicle body frame F is covered with a vehicle body cover C made of resin.

Figure 3:
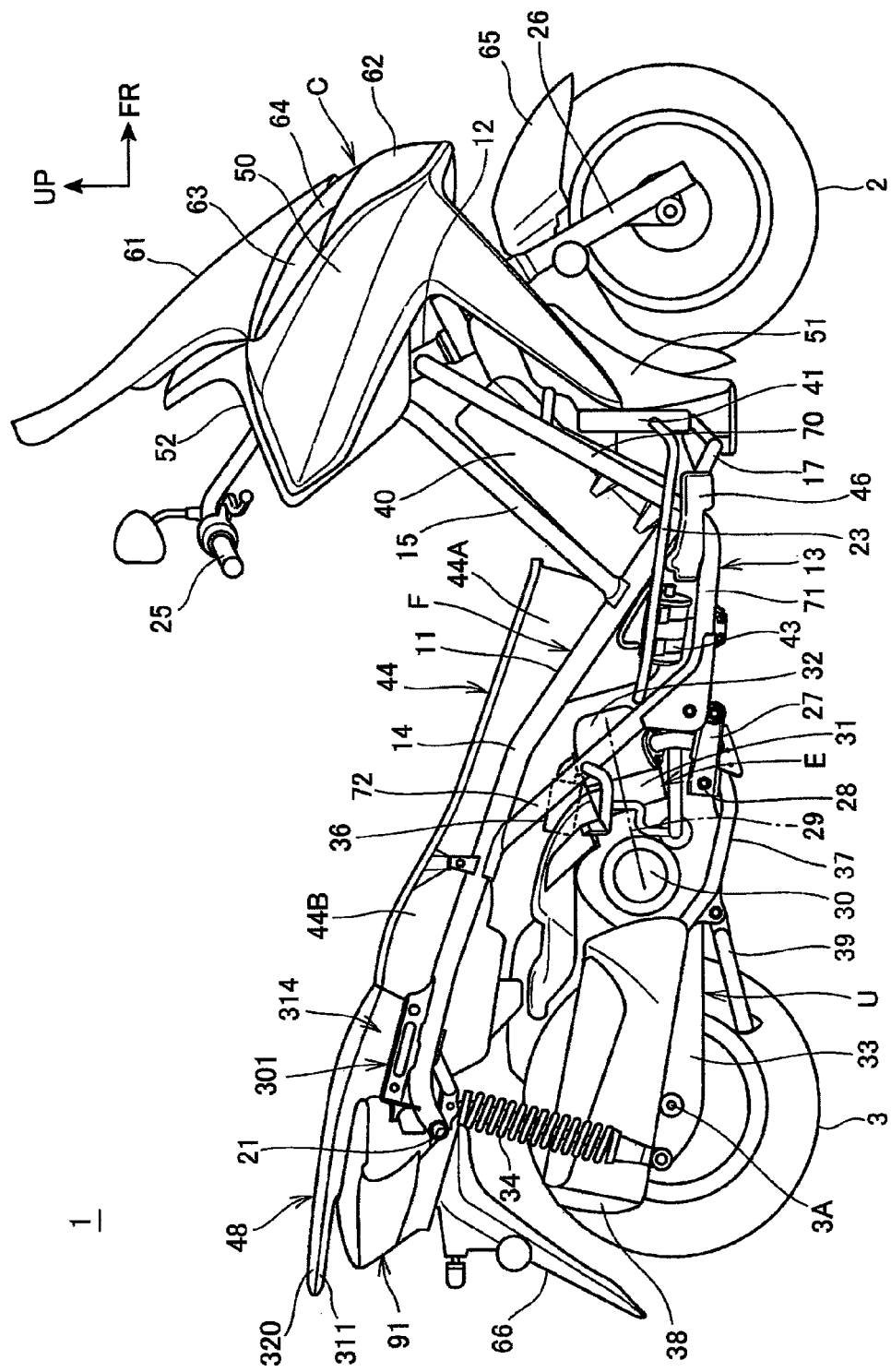
FIG. 3 is a right side elevational view showing the internal structure of the motorcycle.
Figure 4:
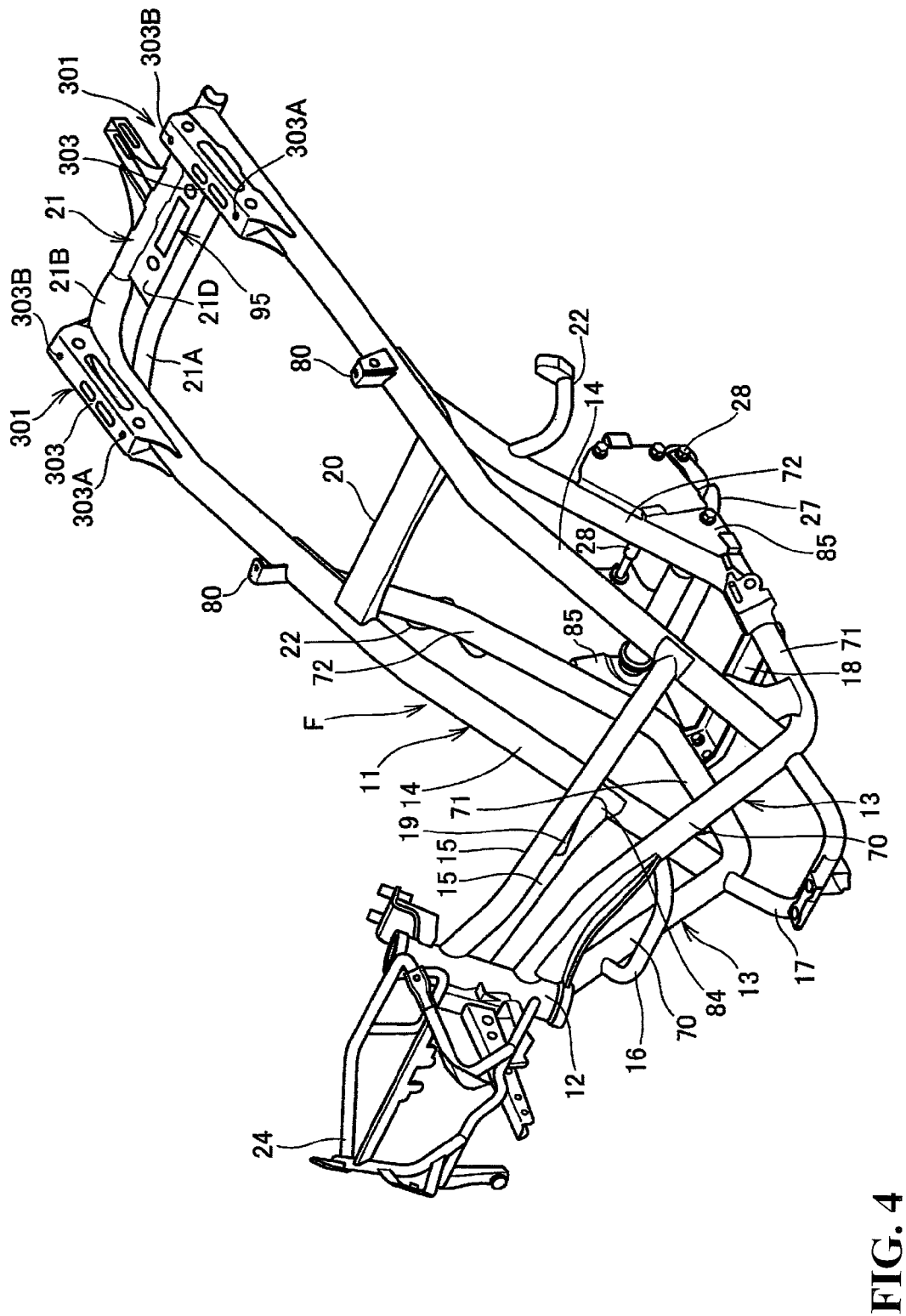
FIG. 4 is a perspective view of a vehicle body frame.

FIG. 2 is a left side elevational view showing an internal structure of the motorcycle 1; FIG. 3 is a right side elevational view showing the internal structure of the motorcycle 1; and FIG. 4 is a perspective view of the vehicle body frame F. In FIGS. 2 and 3, a state wherein the vehicle body cover C is partly removed is illustrated.

As shown in FIGS. 2 to 4, the vehicle body frame F is formed by connecting a plurality of tubes or pipes made of metal to each other by welding. A main frame 11 has a head pipe 12 provided at a front portion, and a pair of left and right down tubes 13, 13 that extend rearwardly downwardly from the head pipe 12 and then extend substantially horizontally rearwardly and further extend rearwardly upwardly at a rear portion. The main frame 11 further has a pair of left and right seat rails 14, 14 extending rearwardly upwardly from a front lower portion of the down tubes 13, 13 to a rear portion of the vehicle, and a pair of left and right upper tubes 15, 15 extending rearwardly downwardly above the down tubes 13, 13 from the head pipe 12 and connected to the seat rails 14, 14.

The down tubes 13, 13 have a downwardly extending portion 70 connected at a front portion thereof to the head pipe 12 and extending rearwardly downwardly, a horizontally extending portion 71 extending substantially horizontally rearwardly from a lower end of the downwardly extending portion 70, and an obliquely upwardly extending portion 72 extending rearwardly upwardly from a rear end of the horizontally extending portion 71.

As shown in FIG. 4, the main frame 11 has cross members that connect the left and right frames to each other. The cross members include a front upper cross member 16 that connects upper portions of the downwardly extending portions 70, 70 of the down tubes 13, 13 to each other. In addition, a front cross member 17 connects lower portions of the downwardly extending portions 70, 70 to each other. The cross members further include a horizontal portion cross member 18 that connects the horizontally extending portions 71, 71 of the down tubes 13, 13 to each other, an upper cross member 19 that connects the upper tubes 15, 15 to each other, and an intermediate cross member 20 that connects the seat rails 14, 14 to each other. The cross members further include a rear cross member 21 that connects rear portions of the seat rails 14, 14. The horizontal portion cross member 18 is connected to the horizontally extending portions 71, 71 by bolting.

A pair of left and right tandem step stays 22, 22 are provided at an upper portion of the obliquely upwardly extending portions 72, 72 of the down tubes 13, 13 in such a manner so as to extend to the outer sides in the vehicle widthwise direction. A cage-like front frame 24 is connected to a front face of the head pipe 12 and supports lamps, the vehicle body cover C and so forth thereon.

Further, a pair of left and right step frames 23 (FIGS. 2 and 3) are provided on the outer sides of the main frame 11 and connected to the down tubes 13, 13 so as to extend in a forward direction and backwardly to support the step floor 68 thereon from below.

As shown in FIGS. 1 to 3, a steering system for steering the front wheel 2 includes a steering shaft (not shown) supported for pivotal motion on the head pipe 12, and a handlebar 25 connected to an upper portion of the steering shaft. The steering shaft is connected at a lower end thereof to a pair of left and right front forks 26, 26, and the front wheel 2 is supported for rotation at a lower end of the front forks 26, 26 and is steered by an operation of the handlebar 25.

The unit swing engine U is of the unit swing type with an engine E and a transmission case M having a belt type continuously variable transmission that are integrated and has a function also as a swing arm that supports the rear wheel 3 thereon. The unit swing engine U is connected to a rear portion of the down tubes 13, 13 through a link member 27 connected to a front portion thereof and is upwardly and downwardly rockable around a pivot shaft 28 provided on the link member 27. It is to be noted that the link member 27 is connected at a front end thereof to a rear portion of the down tubes 13, 13 through a pair of left and right power unit supporting portions 85, 85.

The engine E is a water-cooled four-cycle single cylinder engine and is disposed such that a cylinder axial line 29 thereof extends substantially horizontally in a forward direction. The engine E is configured by coupling a cylinder 31 and a cylinder head 32 (FIG. 3) to a front face of a crankcase 30 disposed at a front portion of the unit swing engine U.

The transmission case M extends rearwardly passing the left side of the rear wheel 3 from a rear portion of the crankcase 30. An arm portion 33 (FIG. 3) is provided at a rear portion of the crankcase 30 and extends rearwardly passing the right side of the rear wheel 3. The rear wheel 3 is supported on an axle 3A provided between a rear portion of the transmission case M and a rear portion of the arm portion 33. Output power of the engine E is transmitted to the rear wheel 3 through the continuously variable transmission.

A pair of left and right rear suspensions 34, 34 extend between rear ends of the transmission case M and arm portion 33 and the seat rails 14, 14.

An air cleaner box 35 (FIGS. 1 and 2) for taking in external air is provided on an upper face of the transmission case M. The air cleaner box 35 is connected to a throttle body 36 (FIG. 3) connected to an intake port on an upper face of the cylinder head 32 by a connecting tube not shown.

An exhaust pipe 37 is connected to an exhaust port on a lower face of the cylinder head 32, and extends rearwardly passing below the engine E, and is connected to a muffler 38 (FIG. 3) fixed to the outer side (right side) of the arm portion 33.

A main stand 39 is provided at a lower portion of a rear portion of the transmission case M for supporting the vehicle in an upwardly erected state.

The fuel tank 40 for reserving fuel for the engine E is formed such that it extends at a front face thereof along the downwardly extending portion 70 of the down tube 13 and at a rear face thereof along the upper tube 15 as viewed in side elevation. In the upward and downward direction, the fuel tank 40 extends long upwardly and downwardly from the rear of a lower portion of the head pipe 12 to the proximity of the horizontally extending portion 71 of the down tube 13. The fuel tank 40 is disposed in a forwardly inclined manner between the left and right down tubes 13, 13.

In a space below a front portion of the forwardly inclined fuel tank 40, a plate-shaped radiator 41 for cooling the cooling water for the engine E is provided. A pair of cooling water pipes 42 (FIG. 2) connect the radiator 41 and the engine E to each other and extend from a left side portion of the radiator 41. Further, the cooling water pipes 42 extend rearwardly below the step frame 23 (FIG. 2) on the left side (one side) of the vehicle and are connected to the engine E passing the inner side of the down tube 13. A side stand 47 is attached to the left side horizontally extending portion 71.

A reservoir tank 46 (FIG. 3) for reserving part of the cooling water for the radiator 41 is disposed below the step frame 23 on the right side (the other side) of the vehicle behind the radiator 41. Meanwhile, a canister 43 (FIG. 3) for absorbing evaporated fuel of the fuel tank 40 is provided below the step frame 23 on the right side behind the reservoir tank 46.

An accommodation box 44 (FIGS. 2 and 3) for accommodating an article therein is attached to the seat rails 14, 14 through box stays 80, 80 (FIG. 4) provided on the seat rails 14, 14. This accommodation box 44 is disposed between the seat rails 14, 14 and extends rearwardly upwardly along the seat rails 14, 14 from the proximity of a rear portion of the fuel tank 40 to above the transmission case M. The accommodation box 44 is formed as a unitary member by resin molding from a front accommodating portion 44A disposed between the fuel tank 40 and the obliquely upwardly extending portion 72 of the down tube 13 and a rear accommodating portion 44B disposed above the unit swing engine U.

The accommodation box 44 is open at an upper face over an overall length thereof. This opening is closed up by the seat 10 (FIG. 1) for an occupant such that it can be opened and closed. The accommodation box 44 is formed in a bottomed box shape open at the upper portion thereof below the seat 10. The seat 10 includes a front seat 10A wherein the rider is seated. In addition, a rear seat 10B is formed higher relative to the front seat 10A by one stage wherein a passenger is to be seated.

At a rear portion of the seat rails 14, 14 behind the accommodation box 44, a grab rail 48 is fixed.

As shown in FIG. 1, the vehicle body cover C includes a front cover 50 for covering the head pipe 12 from the front and the left and right sides and extends downwardly in front of the downwardly extending portion 70 with a front lower cover 51 (FIGS. 2 and 3) connected to a lower portion of the front cover 50. The vehicle body cover C further includes an upper cover 52 connected to an upper portion of the front cover 50 below the handlebar 25 with an upper inner cover 53 connected to left and right edge portions of the front cover 50 and covering the upper tubes 15, 15 and the downwardly extending portion 70 from the rear and from the sides. The vehicle body cover C further includes a pair of left and right lower inner covers 54, 54 connected to a lower edge of the upper inner cover 53 for covering the upper tubes 15, 15 and the downwardly extending portion 70. The vehicle body cover C further includes a pair of left and right step covers 55, 55 connected to a lower portion of the front cover 50 and a lower edge of the lower inner covers 54, 54 for covering the step frames 23, 23 from above. The vehicle body cover C further includes a pair of left and right front floor skirts 56, 56 connected to a lower portion of the front cover 50 and a lower portion of the step covers 55, 55 for covering the step frames 23, 23 from the sides. The vehicle body cover C further includes a pair of left and right rear floor skirts 57, 57 extending rearwardly continuing to the front floor skirts 56, 56 for covering the down tubes 13, 13, and an under cover 58 for covering the left and right horizontally extending portions 71, 71 from below. The vehicle body cover C further includes a pair of left and right body side covers 59, 59 connected to a rear portion of the lower inner covers 54, 54 and the step covers 55, 55 for covering the accommodation box 44 and the seat rails 14, 14 from the sides below the seat 10. The vehicle body cover C further includes a tail cover 60 connected to a rear portion of the body side covers 59, 59.

On the bottom of the left and right step covers 55, 55, the step floors 68 is provided on which the rider seated on the front seat 10A is to place his/her feet.

A windscreen 61 is provided at a front portion of the front cover 50 and extends rearwardly and upwardly. A headlamp 62 is provided at a front end of the front cover 50. In addition, a pair of left and right blinkers 63 are provided continuously to an upper portion of the headlamp 62. A garnish 64 in the form of a plate is provided between the headlamp 62 and the windscreen 61.

A front fender 65 is provided on the front forks 26, 26 and covers the front wheel 2 from above. A rear fender 66 is provided below the body side covers 59, 59 and covers the rear wheel 3 from above.

A pair of retractable tandem steps 67 (FIG. 1) are supported on the tandem step stays 22, 22 for positioning the feet of a passenger on the rear sheet 10B placed thereon.

Now, a structure of a rear portion of the vehicle body is described.

Figure 5:
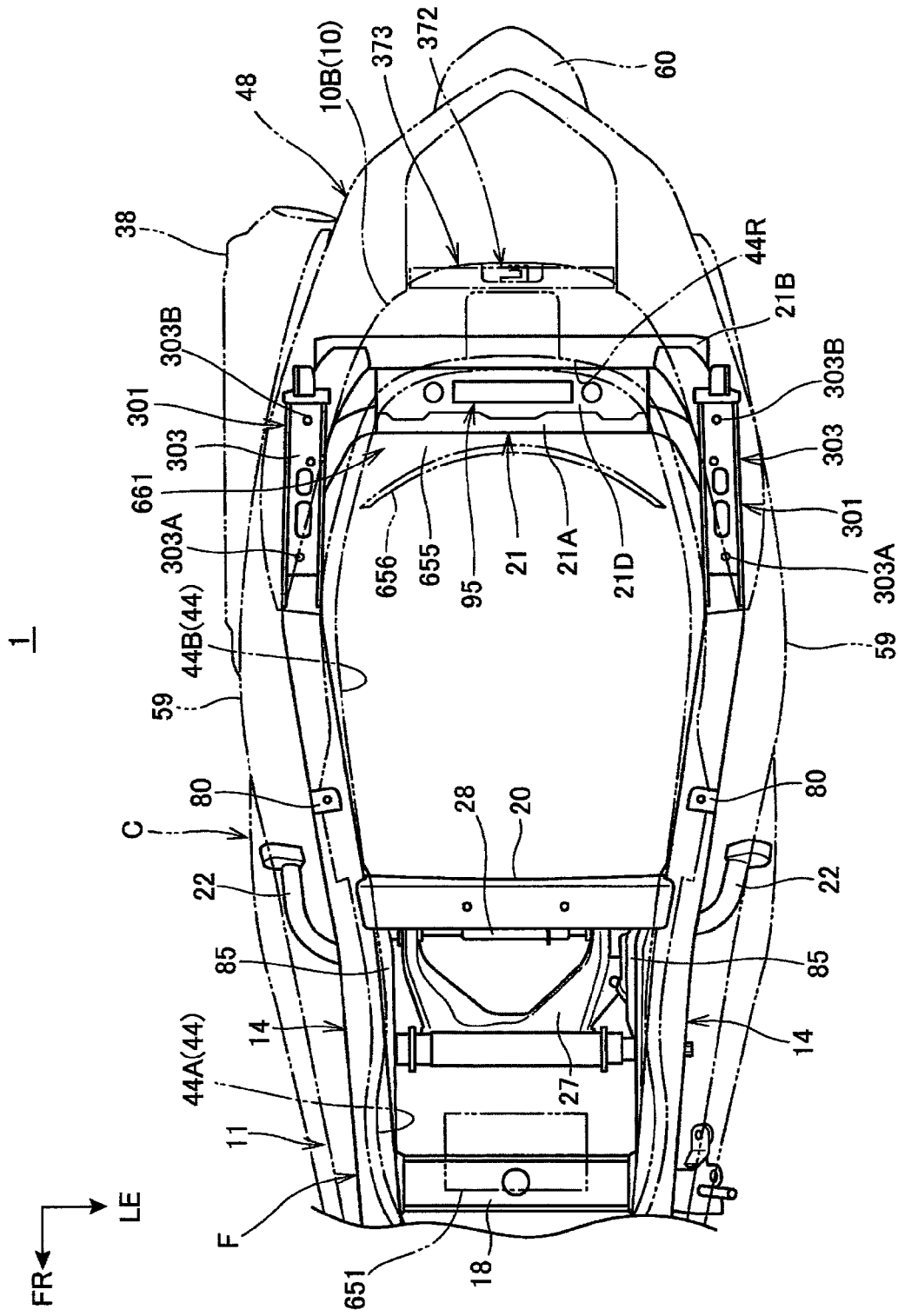
FIG. 5 is a view of a rear portion of a vehicle body as viewed from above.
Figure 6:
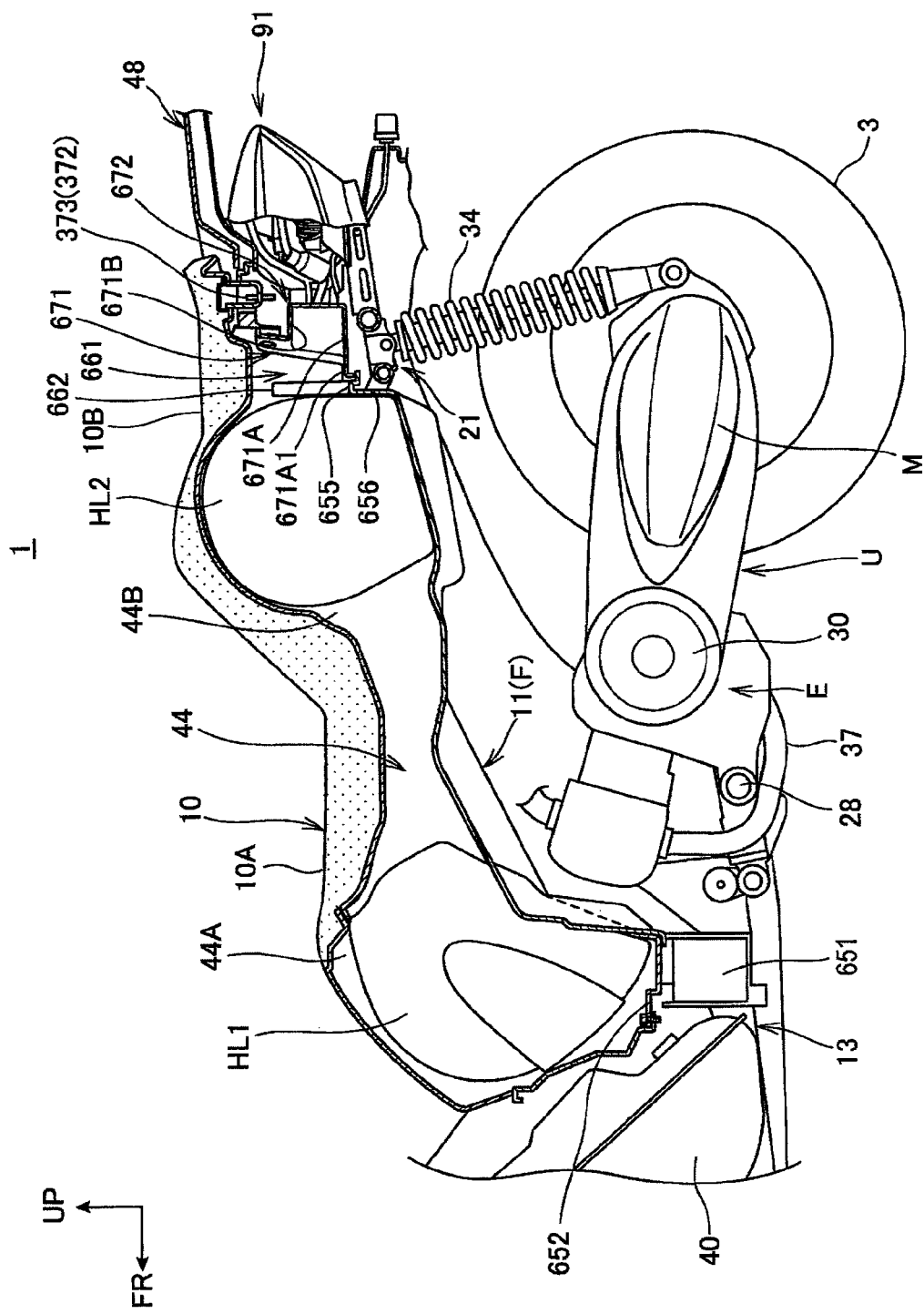
FIG. 6 is a side elevational sectional view showing an accommodation box together with peripheral components.
Figure 7A:
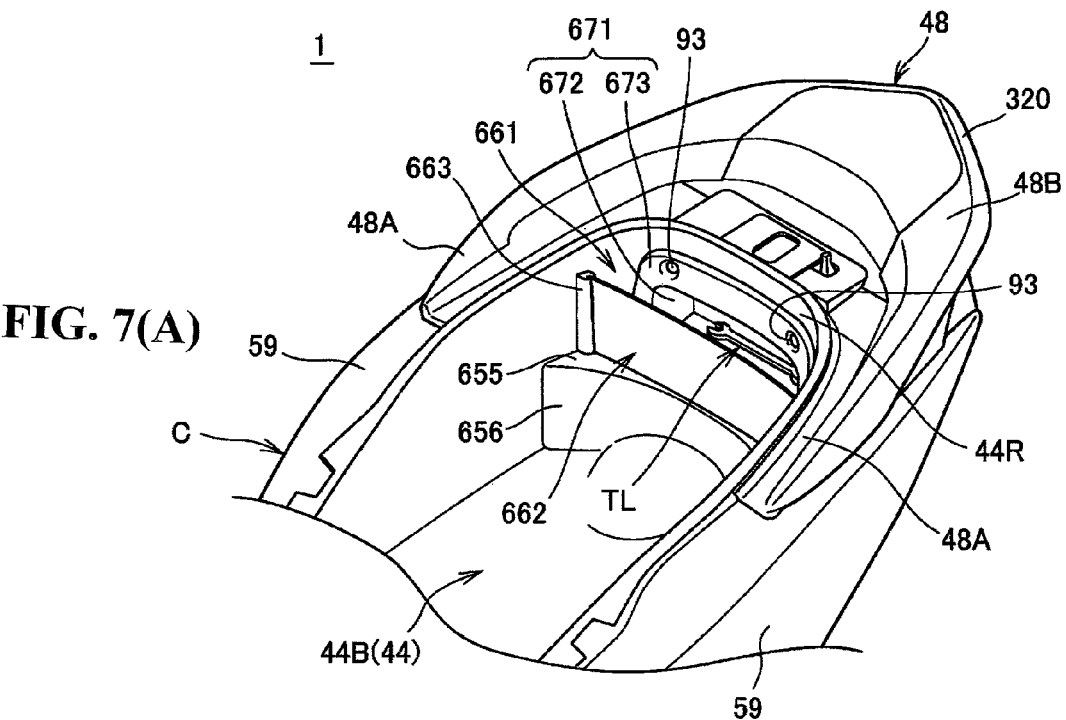
FIG. 7(A) is a perspective view of the accommodation box as viewed from obliquely upwardly together with peripheral components.
Figure 7B:
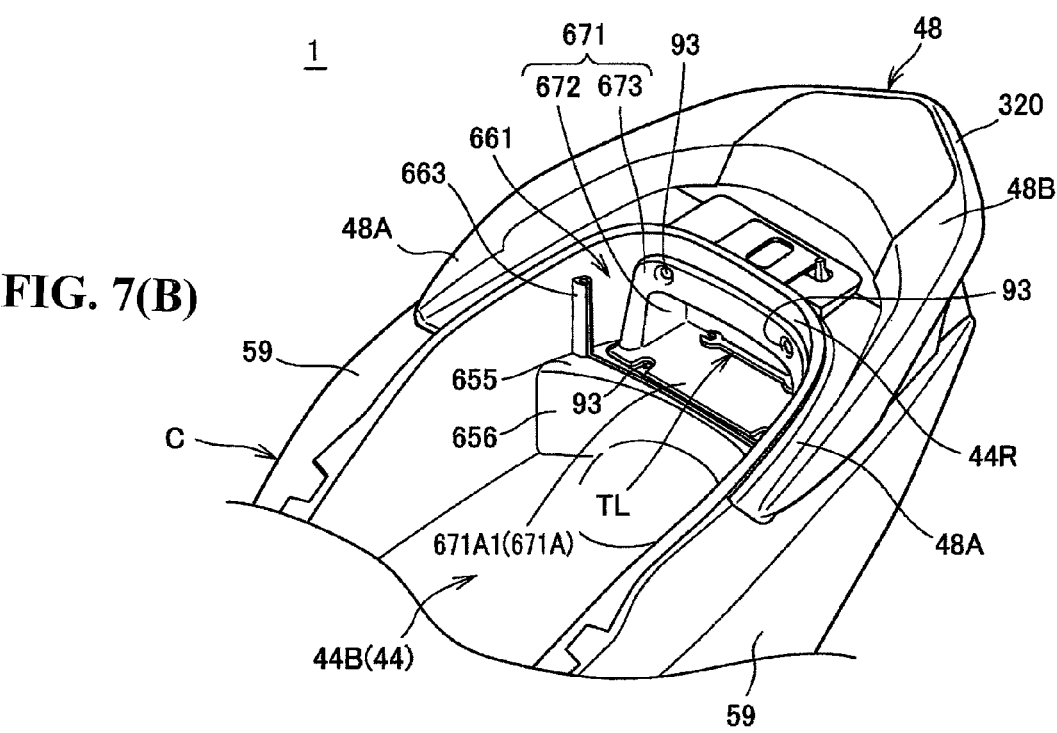
FIG. 7(B) is a view of the accommodation box with a partition plate removed from the state of FIG. 7(A)

FIG. 5 is a view of a rear portion of the vehicle body as viewed from above. In FIG. 5, an internal structure of the vehicle body frame F and so forth is indicated by solid lines, and exterior equipment such as the vehicle body cover C, accommodation box 44 and grab rail 48 is indicated by an alternate long and two short dashes line. FIG. 6 is a side elevational sectional view showing the accommodation box 44 together with peripheral components. FIG. 7(A) is a perspective view of the accommodation box 44 as viewed from obliquely upwardly together with peripheral components. FIG. 7(B) is a view of the accommodation box 44 and peripheral components in a state wherein a partition plate 662 hereinafter described is removed from the state of FIG. 7(A).

As shown in FIG. 5, the paired left and right seat rails 14, 14 are each formed from a single metal pipe and extend to the outer sides in the vehicle widthwise direction toward the rear of the vehicle body such that the distance between the seat rails 14, 14 is expanded toward the rear. Consequently, a front portion of the accommodation box 44 disposed between the seat rails 14, 14 is made comparatively small to facilitate the rider to place his/her feet on the ground while the width of the accommodation box 44 is increased toward the rear so that an accommodation space of an increased width can be assured.

The front accommodating portion 44A of the accommodation box 44 is swollen downwardly in front of the intermediate cross member 20 that connects the seat rails 14, 14 to each other at an intermediate position in the forward and backward direction. The front accommodating portion 44A forms a helmet accommodating section that can accommodate a single helmet HL1 therein as seen in FIG. 6.

A battery 651 (FIGS. 5 and 6) is disposed below the front accommodating portion 44A and above the horizontal portion cross member 18, that connects the down tubes 13, 13 (FIG. 4) to each other, and serves as a power supply source to the components. This battery disposition can contribute to concentration of the mass of the motorcycle 1 because the battery 651 is positioned intermediately in the forward and backward direction as viewed in top plan of the vehicle. It is to be noted that a removable cover 652 (FIG. 6) for allowing accessing to the battery 651 is fastened to a bottom plate of the front accommodating portion 44A by a bolt such that, by removing the cover 652, a maintenance operation or replacement of the battery 651 can be readily carried out.

The rear accommodating portion 44B of the accommodation box 44 is swollen downwardly behind the intermediate cross member 20 and forms a helmet accommodating section wherein a single helmet HL2 can be accommodated. The rear accommodating portion 44B has a raised bottom 655 provided behind the helmet accommodating section with a difference in level from the floor of the helmet accommodating section and extending rearwardly.

A wall portion 656 (FIGS. 7(A) and 7(B)) that forms the difference in level is formed on a wall that is curved convex toward the rear as viewed in a top plan view. In other words, the wall portion 656 is formed in a shape wherein, when the helmet HL2 is accommodated in the rear accommodating portion 44B, the wall portion 656 extends along an outer edge of the helmet HL2.

The raised bottom 655 extends horizontally rearwardly from an upper edge of the wall portion 656 over an overall width of the rear accommodating portion 44B and rising, at a rear edge thereof, upwardly to form a rear wall 44R (FIGS. 7(A) and 7(B)) of the rear accommodating portion 44B. Consequently, an upwardly open accommodation portion 661 that is open upwardly and has a comparatively shallow bottom can be formed between the helmet accommodating section of the rear accommodating portion 44B and the rear wall 44R.

As shown in FIG. 7(A), a partition plate 662 is provided in an uprightly erected state in the proximity of a front edge of the raised bottom 655 and extends in the vehicle widthwise direction such that it partitions the rear accommodating portion 44B into front and rear portions. By the partitioning, the upwardly open accommodation portion 661 can be a dedicated space for small articles suitable for accommodating a comparatively small article such as a bag. In this instance, if an article of a substantially square shape having a comparatively small thickness such as a business bag is accommodated, then the article can be held at a location of a large area on the opening side of the accommodation box 44 making use of the raised bottom 655 that provides a difference in level.

Further, the partition plate 662 described hereinabove is removably provided by left and right rails 663, 663 provided on the left and right side walls of the accommodation box 44. Thus, the partition plate 662 can be removed to expand the accommodation space to an accommodation space that is greater in the forward and backward direction as seen in FIG. 7(B).

Figure 8:
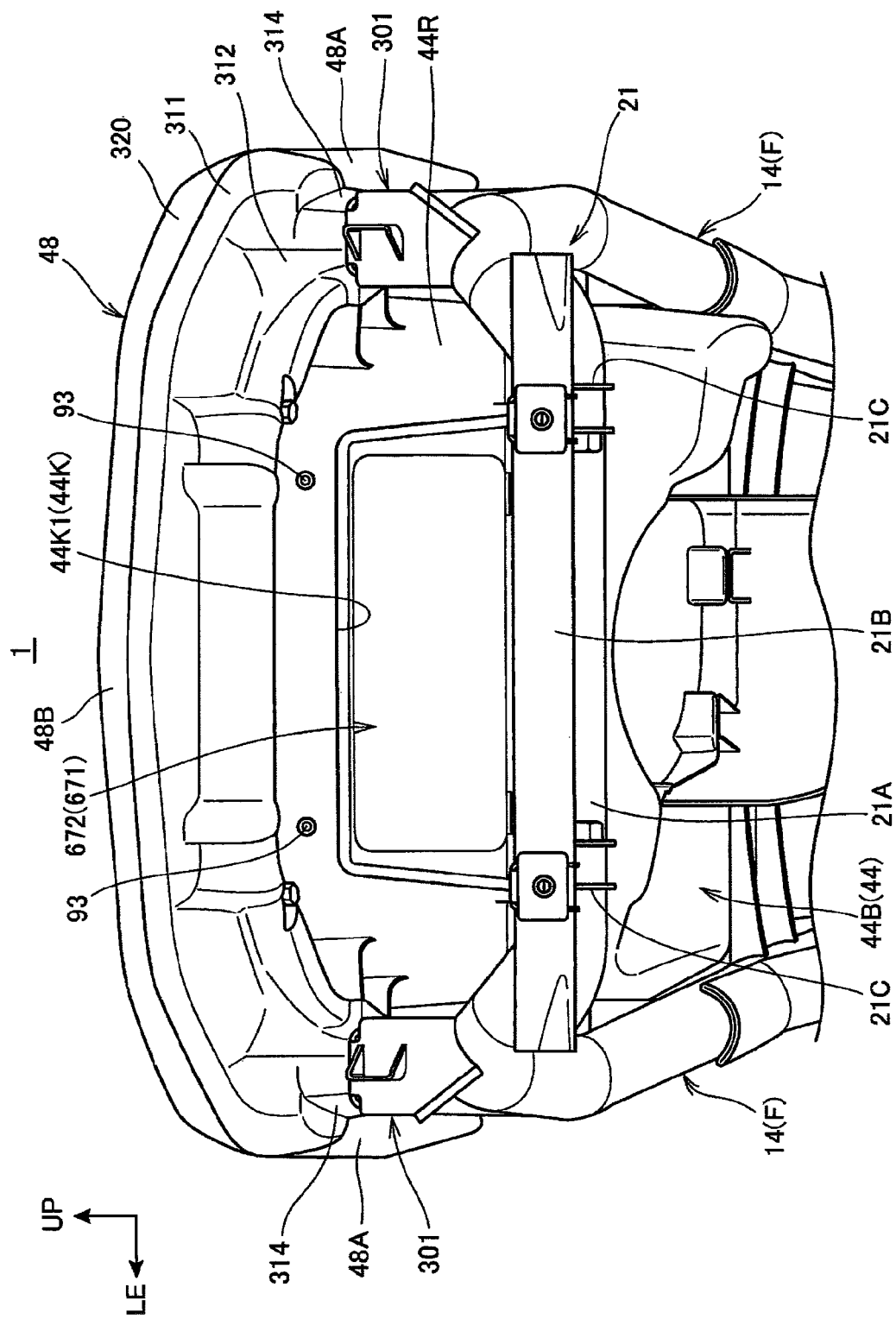
FIG. 8 is a view of a rear portion of the accommodation box as viewed from behind together with peripheral components.
Figure 9:
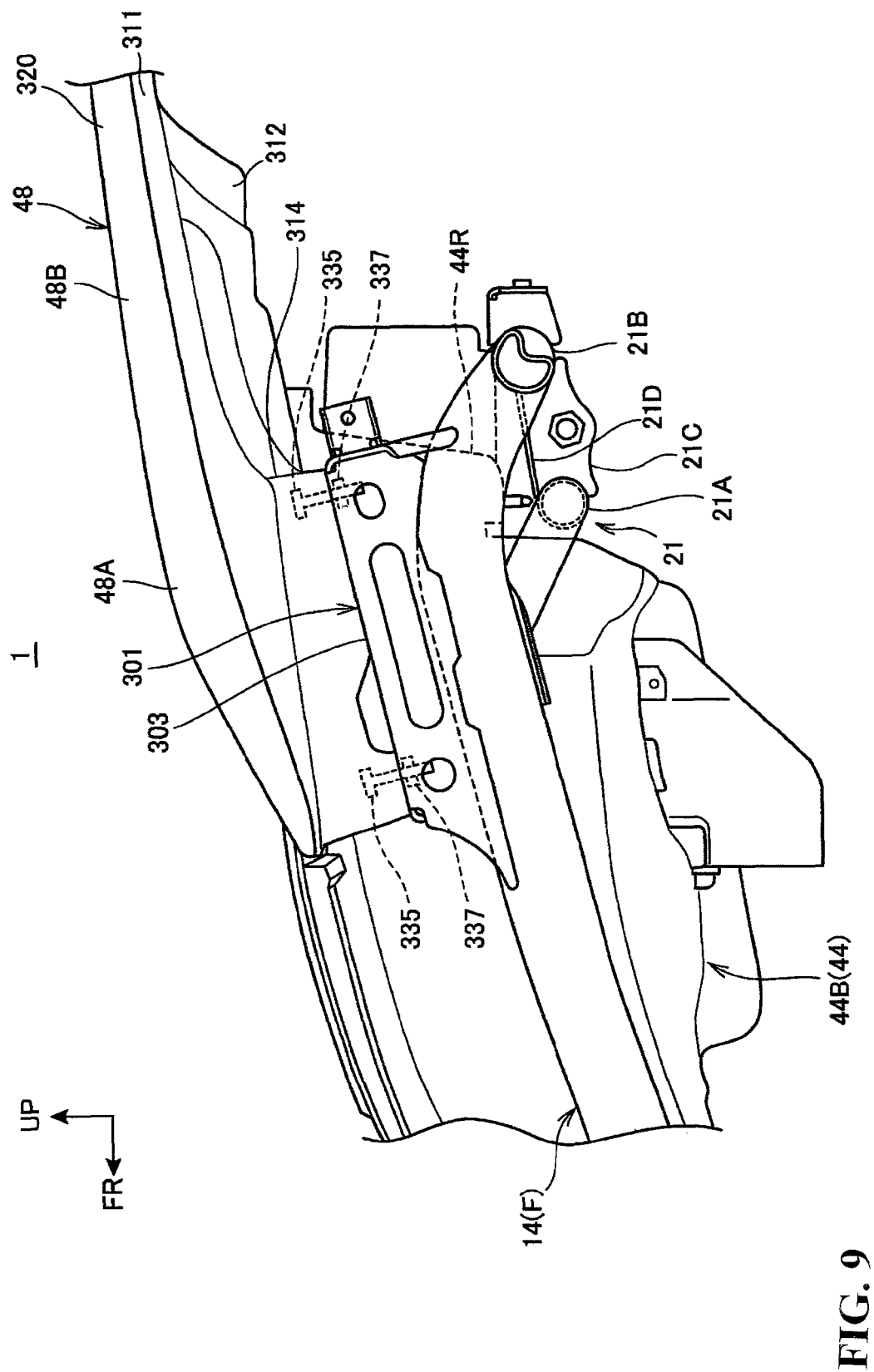
FIG. 9 is a view of the rear portion of the accommodation box of FIG. 8 as viewed from the left side.

FIG. 8 is a view of a rear portion of the accommodation box 44 as viewed from behind together with peripheral components; FIG. 9 is a view of the rear portion of the accommodation box 44 of FIG. 8 as viewed from the left side and FIG. 10 is a side elevational sectional view of the rear portion of the accommodation box 44 shown in FIG. 9.

Figure 10:
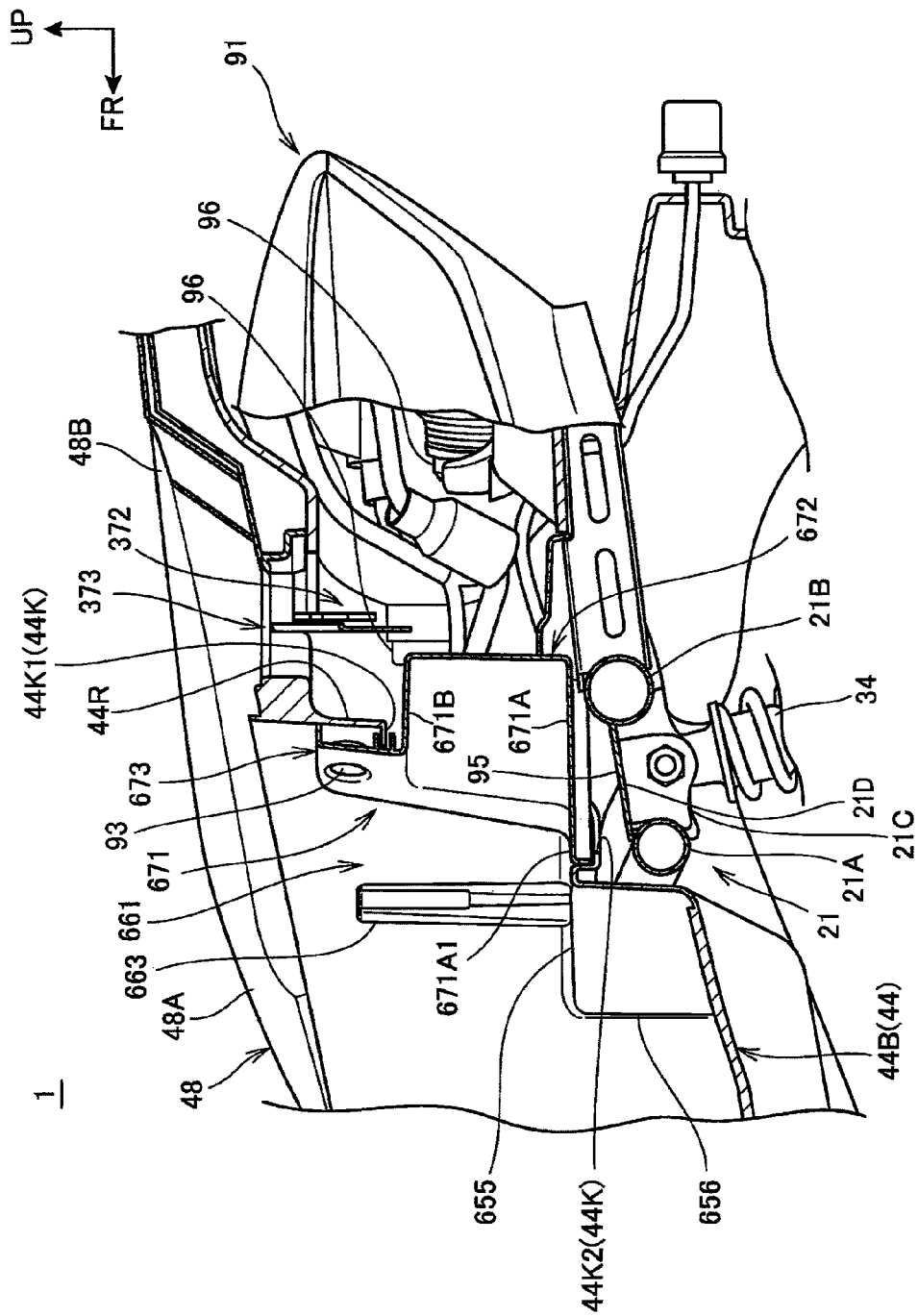
FIG. 10 is a side elevational sectional view of the rear portion of the accommodation box of FIG. 9.

As shown in FIGS. 8 to 10, the paired left and right seat rails 14, 14 extend to the proximity of a rear end of the accommodation box 44 passing the sides of the rear accommodating portion 44B as viewed in side elevation of the vehicle body and are connected to each other by the rear cross member 21 passing below the raised bottom 655.

The rear cross member 21 includes pipes 21A and 21B made of metal and provided in a spaced relationship from each other in the forward and backward direction with vertical plates 21C made of metal and extending in a forward direction and backwardly between the pipes 21A and 21B to bridge the pipes 21A and 21B. The rear cross member 21 further includes a bridge plate 21D made of metal and extending in a forward direction and backwardly with a predetermined width along an upper face of the vertical plates 21C to bridge the pipes 21A and 21B substantially horizontally. The rear cross member 21 is configured by joining the pipes 21A and 21B, vertical plates 21C and bridge plate 21D by welding or the like. Consequently, the rear cross member 21 is formed as a cross member having rigidity higher than that of a cross member configured from a single pipe member.

By the configuration described above, the seat rails 14, 14 do not project rearwardly farther than the accommodation box 44, and swelling of the vehicle body frame F to the rear of the accommodation box 44 can be suppressed. Consequently, while the space for the accommodation box 44 is assured, rearward swelling of the vehicle body frame F is suppressed, thereby to achieve both an assurance of the accommodation space and a miniaturization of the vehicle body frame F.

The grab rail 48 (FIGS. 7(A) and 7(B) to FIG. 9) is formed in a U-shape that extends along a rear edge of the rear seat 10B and is open in a forward direction, and functions as a grip member that is gripped by a passenger seated on the rear seat 10B. The grab rail 48 has a pair of left and right arm portions 48A, 48A extending in a forward direction with a connecting portion 48B connecting the arm portions 48A, 48A to each other.

The grab rail 48 has a grab rail main body 311 fastened to the seat rails 14, 14 through grab rail supporting gussets 301 (FIGS. 4 and 9), and a grab rail cover 320 that covers the grab rail main body 311 from above. The grab rail 48 is shaped such that it extends rearwardly upwardly as viewed in a side elevation of the vehicle.

As shown in FIG. 4, the grab rail supporting gusset (hereinafter referred to as gussets) 301 are joined to an upper face of a rear portion of the seat rails 14 by welding and are formed in the shape of a box extending rearwardly upwardly in the forward and backward direction of the vehicle. An upper plate portion 303 of the gussets 301 is formed as an inclined plate extending linearly rearwardly and upwardly with female threaded portions (fastening object portions) 303A and 303B for attachment of the grab rail being provided in a forwardly and backwardly spaced relationship from each other on the upper plate portion 303.

Meanwhile, as shown in FIG. 9, the grab rail main body 311 integrally includes left and right fastening portions 314, 314 (FIGS. 8 and 9) swollen downwardly from a front portion of a bottom plate portion 312 of a U-shape open forwardly. The grab rail main body 311 is fixed to the vehicle body frame F by fitting the fastening portions 314, 314 from above into the female threaded portions (fastening object portions) 303A and 303B (FIG. 4) of the gussets 301 with bolts (fastening members) 335, 335 and fastening the bolts 335, 335 to nuts 337, 337 joined to the rear face of the upper plate portion 303.

Consequently, the grab rail 48 is fixed to the vehicle body frame F only by the fastening portions 314, 314 provided at a front portion of the paired left and right arm portions 48A, 48A.

FIG. 10 is a side elevational sectional view showing a rear portion of the accommodation box 44 together with peripheral components. As shown in FIG. 10, an opening 44K is provided in the rear wall 44R of the accommodation box 44 such that it opens in a forward direction. A sub-accommodation box 671 in the form of a box open in a forward direction is mounted on the opening 44K in such a manner so as to close up the opening 44K.

Figure 11A:
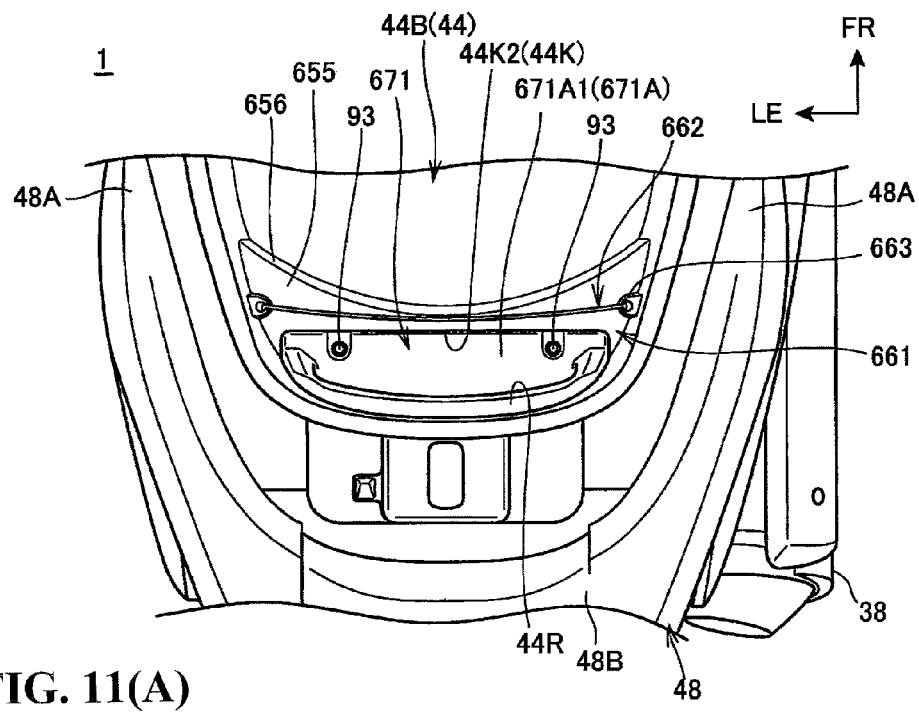
FIG. 11(A) is a view of the accommodation box when an opening thereof is viewed from upwardly in a state in that a sub-accommodation box is attached.
Figure 11B:
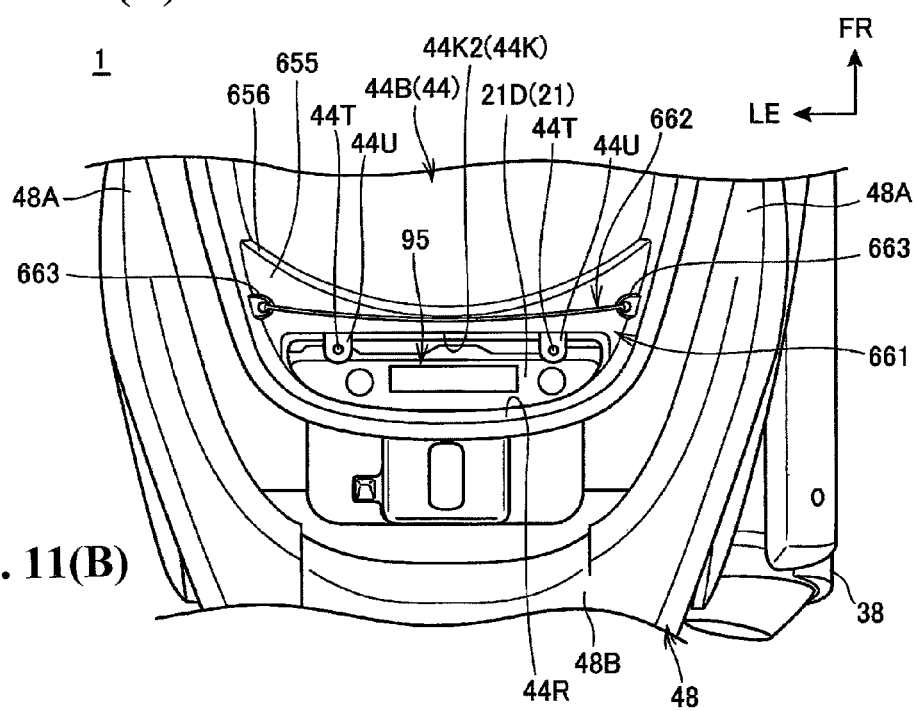
FIG. 11(B) is a view of the accommodation box with the sub-accommodation box removed from the state of FIG. 11(A)
Figure 12:
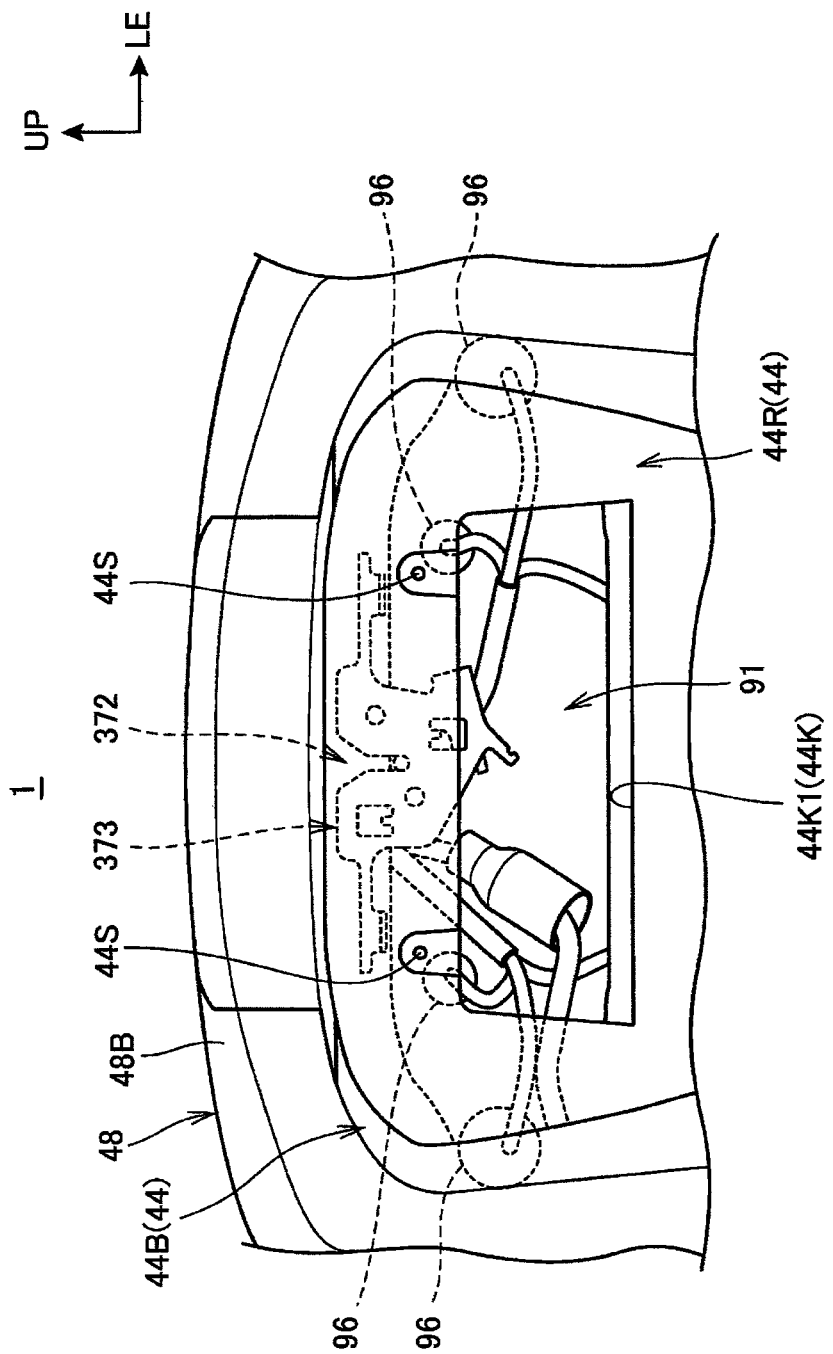
FIG. 12 is a view of the opening of FIG. 11(B) as viewed from the front.

FIG. 11(A) is a view of the opening 44K of the accommodation box 44 as viewed from above in a state in that the sub-accommodation box 671 is attached, and FIG. 11(B) is a view of the opening 44K of the accommodation box 44 with the sub-accommodation box 671 removed from the state illustrated in FIG. 11(A). FIG. 12 is a view of the opening 44K of FIG. 11(B) as viewed from a forward direction.

As shown in FIGS. 11(A) and (B) and FIG. 12, the opening 44K integrally includes a rectangular front opening 441(1 (FIG. 12) and a substantially rectangular upper opening 44K2 (FIGS. 11(A) and 11(B)). The front opening 44K1 is formed in the rear wall 44R of the accommodation box 44 and is open in a forward direction, and the upper opening 44K2 is formed in the raised bottom 655 and is open upwardly. The upper opening 441K2 is contiguous with the same width to a lower edge of the front opening 44K1.

As shown in FIG. 10, the sub-accommodation box 671 integrally includes a box main body 672 open in a forward direction, inserted in the front opening 44K1 and swollen rearwardly farther than the opening 44K, and a flange portion 673 extending at a front portion of the box main body 672. The box main body 672 is stopped by the flange portion 673 so that it may not come out rearwardly of the opening 44K and the attached position of the box main body 672 is positioned on the accommodation box 44. Further, a bottom plate 671A of the sub-accommodation box 671 has a forwardly swollen portion 671A1 that is swollen forwardly farther than a top plate 671B of the sub-accommodation box 671 such that the upper opening 44K2 is closed up with the forwardly swollen portion 671A1.

In this manner, the opening 44K provided at the rear end of the accommodation box 44 is formed so as to open in a forward direction and upwardly and is closed up with the sub-accommodation box 671. The sub-accommodation box 671 forms an accommodation space that is swollen rearwardly farther than the opening 44K and is open in a forward direction.

In this instance, since the sub-accommodation box 671 is swollen rearwardly farther than the accommodation box 44, the accommodation space can be expanded making use of the space behind the accommodation box 44. More particularly, the accommodation space can be expanded rearwardly making use of the space formed between the accommodation box 44 and a rear lamp unit 91 disposed behind the accommodation box 44.

The bottom plate 671A of the sub-accommodation box 671 has the forwardly swollen portion 671A1 that is swollen forwardly farther than the top plate 671B of the sub-accommodation box 671 with the forwardly swollen portion 671A1 covering the upper opening 44K2. Therefore, an accommodation space can be formed that has a flat bottom face with the sub-accommodation box 671 such that an article can be readily taken into and out of the accommodation space in the forward and backward direction. In the sub-accommodation box 671, accessories TL (FIGS. 7(A) and 7(B)) such as, for example, a vehicle-carried tool or a document are accommodated.

Clip attachment holes 44S, 44S (FIG. 12) are provided in a leftwardly and rightwardly spaced relationship from each other adjacent an upper edge of the front opening 44K1 in the rear wall 44R of the accommodation box 44. Further, a pair of left and right stays 44U, 44U (FIG. 11(B)) are provided on the raised bottom 655 of the accommodation box 44 such that they project into the front opening 44K1 and have clip attachment holes 44T, 44T. The sub-accommodation box 671 is clip-fixed to the accommodation box 44 making use of the clip attachment holes 44S, 44S, 44T, 44T.

For the clips (in the present configuration, four clips) 93 for use for the clip fixation, a known resin clip (attachment member) that can be mounted and dismounted readily is used suitably, and the sub-accommodation box 671 can be mounted and dismounted readily. It is to be noted that not the clips 93 may be used for the locking member, but a locking member or a fastening member other than a clip may be used.

Further, in the present configuration, the sub-accommodation box 671 is fixed by the paired left and right clips 93, 93 extending in the forward and backward direction and the paired left and right clips 93, 93 extending in the upward and downward direction perpendicular to the axial direction of the clips 93, 93. Therefore, upward or downward displacement and leftward or rightward displacement of the sub-accommodation box 671 can be prevented appropriately.

Further, the flange portion 673 that configures a peripheral edge of a front portion of the sub-accommodation box 671 is formed in an overlapping relationship with a peripheral edge of the opening 44K, and the sub-accommodation box 671 is attached from the accommodation box 44 side. Therefore, even if the opening 44K that is large is formed on the accommodation box 44, the rigidity of the rear wall 44R of the opening 44K can be assured. Further, since the sub-accommodation box 671 itself has a three-dimensional shape, it is high in rigidity, and even if the rear wall 44R of the accommodation box 44 is reduced in thickness to achieve reduction in weight, the function is not degraded.

As shown in FIG. 10, in the present configuration, the rear cross member 21 extends below the opening 44K of the accommodation box 44, and the bridge plate 21D that substantially horizontally bridges the paired front and rear pipes 21A and 21B of the rear cross member 21 is positioned below the upper opening 44K2.

An identification section 95 (FIG. 11(B)) on that identification information for identifying the vehicle is described is provided on an upper face of the bridge plate 21D. In a state in that the sub-accommodation box 671 is removed as shown in FIG. 11(B), the identification section 95 is exposed in the upper opening 44K2 and can be visually confirmed from above.

Consequently, in the motorcycle 1 of the full cover type wherein the vehicle body frame F is covered with the vehicle body cover C and the accommodation box 44, it becomes possible to visually confirm the identification section 95 provided on the vehicle body frame F by simple removal of the sub-accommodation box 671. It is to be noted that hollows for weight reduction are provided on the left and the right of the identification section 95 of the bridge plate 21D.

In the state in that the sub-accommodation box 671 is removed, the rear face of the rear lamp unit 91 behind the accommodation box 44 is exposed from the front opening 44K1 as seen in FIG. 12. Therefore, light bulbs 96 (in the present configuration, four light bulbs 96), wiring lines and so forth on the rear face of the rear lamp unit 91 can be accessed readily. Consequently, a maintenance operation such as a replacement operation of a light bulb 96 can be carried out readily. It is to be noted that the light bulbs 96 are used for a stop lamp that is lit upon braking operation and the blinker lamps.

Figure 13:
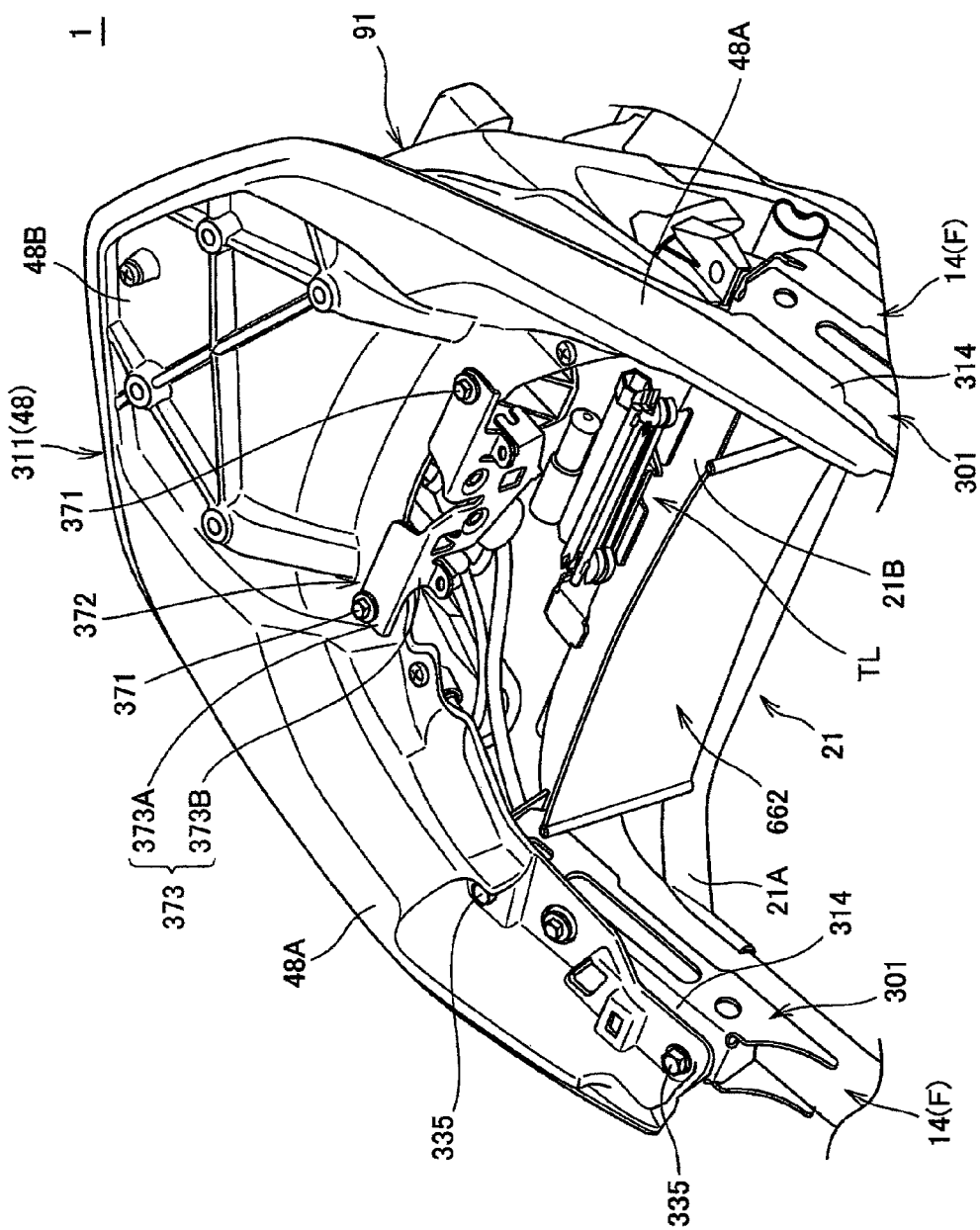
FIG. 13 is a view of a grab rail main body as viewed from obliquely upwardly together with peripheral components.
Figure 14:
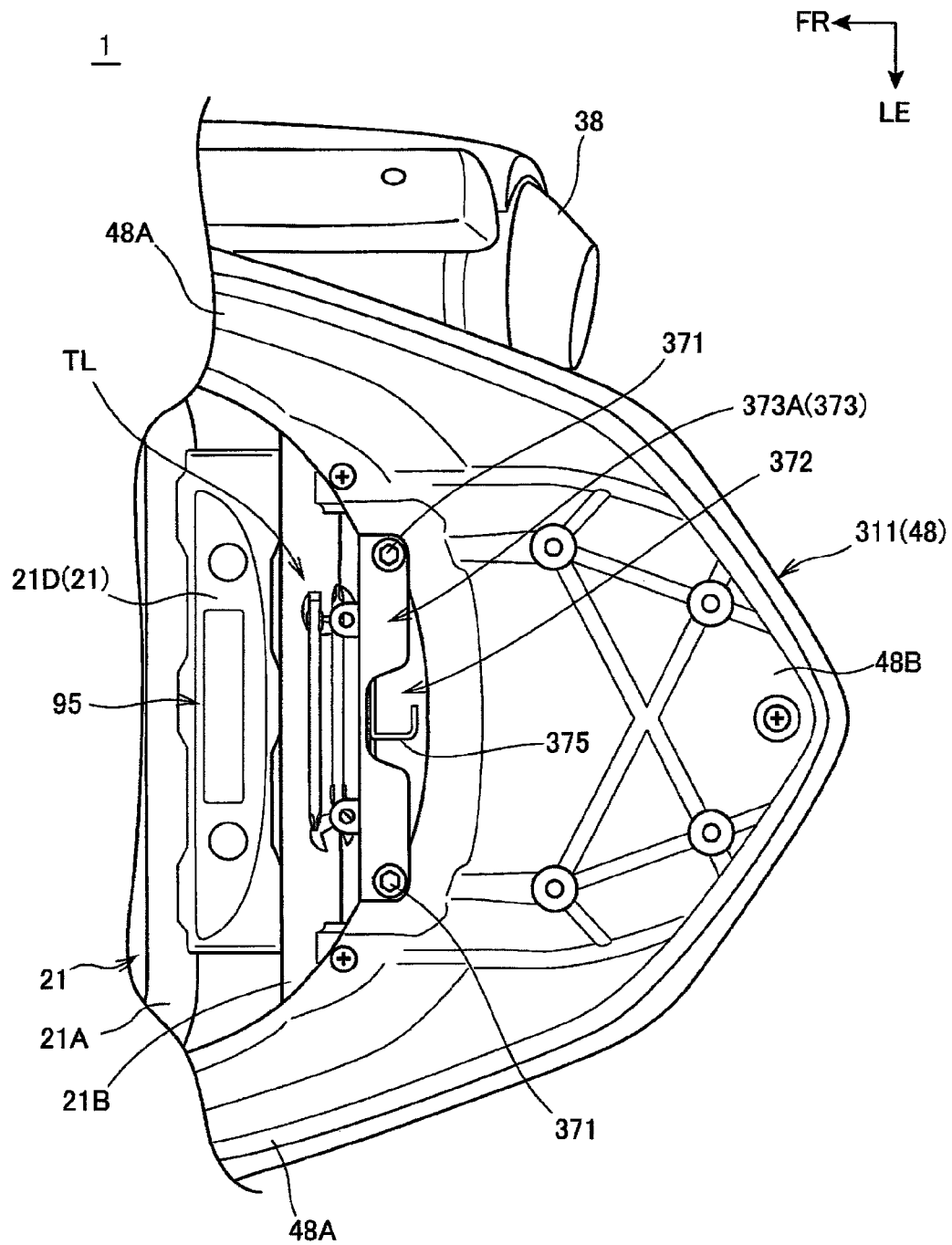
FIG. 14 is a view of the grab rail main body as viewed from upwardly together with peripheral components.

FIG. 13 is a view of the grab rail main body 311 as viewed from obliquely upwardly together with peripheral components, and FIG. 14 is a view of the grab rail main body 311 as viewed from above.

As shown in FIGS. 13 and 14, a front edge of the bottom plate portion 312 of the grab rail main body 311 extends in a U-shape that is open in a forward direction as viewed in a top plan view. A seat catch plate 373 of a locking mechanism 372 for locking the seat 10 is attached to a central portion in the leftward and rightward direction of the front edge of the bottom plate portion 312 by a pair of left and right bolts 371, 371.

The seat catch plate 373 integrally has a fastening plate portion 373A fastened in the proximity of the front edge of the bottom plate portion 312 by the bolts 371, 371 and a plate main body 373B bent and extending downwardly from a front edge of the fastening plate portion 373A. Mechanical parts of the locking mechanism 372 are attached to the plate main body 373B to configure a seat catch (also referred to as seat catch mechanism).

The locking mechanism 372 including the plate main body 373B is provided utilizing a space formed between the front edge of the grab rail main body 311 and the sub-accommodation box 671 as shown in FIG. 10.

By fixing the locking mechanism 372 to the grab rail 48 in this manner, there is no necessity to lay out the vehicle body frame F at the position in comparison with an alternative configuration wherein a locking mechanism of the type described is fixed to the vehicle body frame F. Consequently, compaction of the vehicle body frame F and neighboring arrangement of the locking mechanism 372 and the sub-accommodation box 671 can be anticipated. Thus, compaction behind the accommodation box 44 can be anticipated.

Further, since the seat catch plate 373 is positioned behind the rear cross member 21 as viewed in a top plan view as shown in FIG. 14, the seat catch plate 373 does not make an obstacle when the identification section 95 provided on the rear cross member 21 is visually confirmed from above.

Further, in the present configuration, an engaging pawl 375 for engaging with the seat 10 is disposed in the space formed between the plate main body 373B and the grab rail main body 311. By this configuration, it is possible to make accessing to the engaging pawl 375 from above difficult.

As described above, according to the present embodiment, in the configuration wherein the opening 44K is provided in the rear wall 44R of the accommodation box 44 that is opened and closed by the seat 10 for an occupant as shown in FIG. 10. The sub-accommodation box 671 is provided that is in the form of a box open in a forward direction and is mounted in such a manner so as to close up the opening 44K and be swollen rearwardly farther than the opening 44K. Therefore, the accommodation space can be formed in a complicated shape. Further, the accommodation space can be expanded with such a simple and easy configuration that the sub-accommodation box 671 is attached to the opening 44K of the accommodation box 44 and with a reduced number of parts.

Further, the bottom plate 671A of the sub-accommodation box 671 has the forwardly swollen portion 671A1 that is swollen in a forward direction farther than the top plate 671B of the sub-accommodation box 671 with the rear cross member 21 extending below the forwardly swollen portion 671A1. Further, the identification section 95 (FIG. 11(B)) for the identification of the motorcycle 1 is provided at a position on the rear cross member 21 wherein it overlaps with the forwardly swollen portion 671A1 as viewed in a top plan view of the vehicle body. Therefore, if the sub-accommodation box 671 is removed, then confirmation of the identification section 95 can be readily carried out. Further, in a normal use state wherein such confirmation of the identification section 95 is not required, the identification section 95 is prevented from being exposed by the sub-accommodation box 671, and the appearance is improved.

Further, since the rear cross member 21 connects the left and right seat rails 14, 14 to each other at the rearmost end of the vehicle body frame F, the sub-accommodation box 671 can be disposed making use of the space around the rearmost end of the vehicle body frame F. Further, expansion of the accommodation space and reduction of the rearward length of the vehicle body frame F can be anticipated. If it is intended to additionally provide an accommodation section on the rear fender 66, it is necessary to cause the vehicle body frame F to extend rearwardly so that the rear fender 66 can support the weight of loaded stuff. However, with the present configuration, since the sub-accommodation box 671 is held by the accommodation box 44, there is no necessity to cause the vehicle body frame F to extend rearwardly. Consequently, both an assurance of an accommodation space and a reduction in length of the vehicle body frame F can be achieved. Thus, compaction and reduction in weight of the vehicle can be anticipated.

Further, since the rear lamp unit 91 is disposed and wiring lines and so forth (including the light bulbs 96) connected to the rear lamp unit 91 are wired behind the sub-accommodation box 671, the accommodation space can be maximized as far as possible while interference between the loaded stuff and the wiring lines and so forth is prevented by the sub-accommodation box 671. Further, maintenance of the bulbs of the rear lamp unit 91 can be carried out by removing the sub-accommodation box 671. Thus, there is no necessity to separately provide a maintenance lid.

Further, the U-shaped grab rail 48 that is open in a forward direction is provided, and the fastening portions 314, 314 to the vehicle body frame F are provided on the paired left and right arm portions 48A, 48A of the grab rail 48. Further, the connecting portion 48B that connects the paired left and right arm portions 48A, 48A to each other is disposed behind the sub-accommodation box 671, and the locking mechanism 372 that configures a seat catch is provided at a front portion of the connecting portion 48B. Therefore, in comparison with an alternative case wherein the seat catch is attached to the vehicle body frame F, compaction of the vehicle body frame F and compaction in the rear of the accommodation box 44 by neighboring arrangement of the seat catch and the sub-accommodation box 671 can be anticipated.

Further, since the partition plate 662 is provided in front of the sub-accommodation box 671, an accommodation space for accessories including the sub-accommodation box 671 can be assured in a partitioned relationship from the main accommodation space of the accommodation box 44.

Further, the flange portion 673 that configures a peripheral edge of a front portion of the sub-accommodation box 671 is attached to the accommodation box 44 in an overlapping relationship with a peripheral edge of the opening 44K of the accommodation box 44. Therefore, the rigidity of the rear wall 44R of the opening 44K can be improved by the rigidity of the flange portion 673 and the sub-accommodation box 671 themselves. Consequently, even if the thickness of the rear wall 44R is reduced to achieve a reduction in weight, the rigidity of a rear portion of the accommodation box 44 can be improved.

Figure 15:
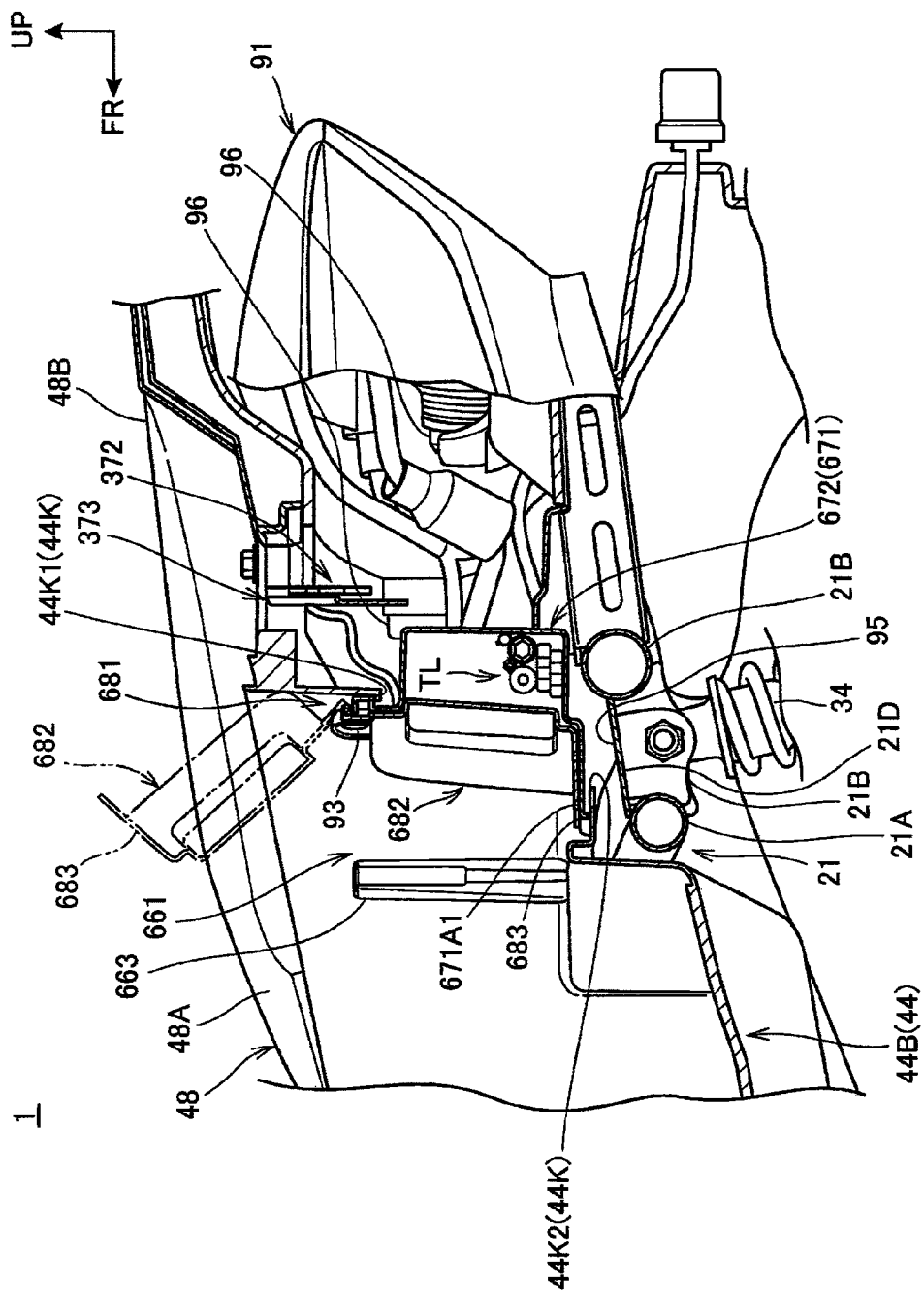
FIG. 15 is a side elevational sectional view showing a rear portion of an accommodation box of a motorcycle according to a second embodiment together with peripheral components.
Figure 16:
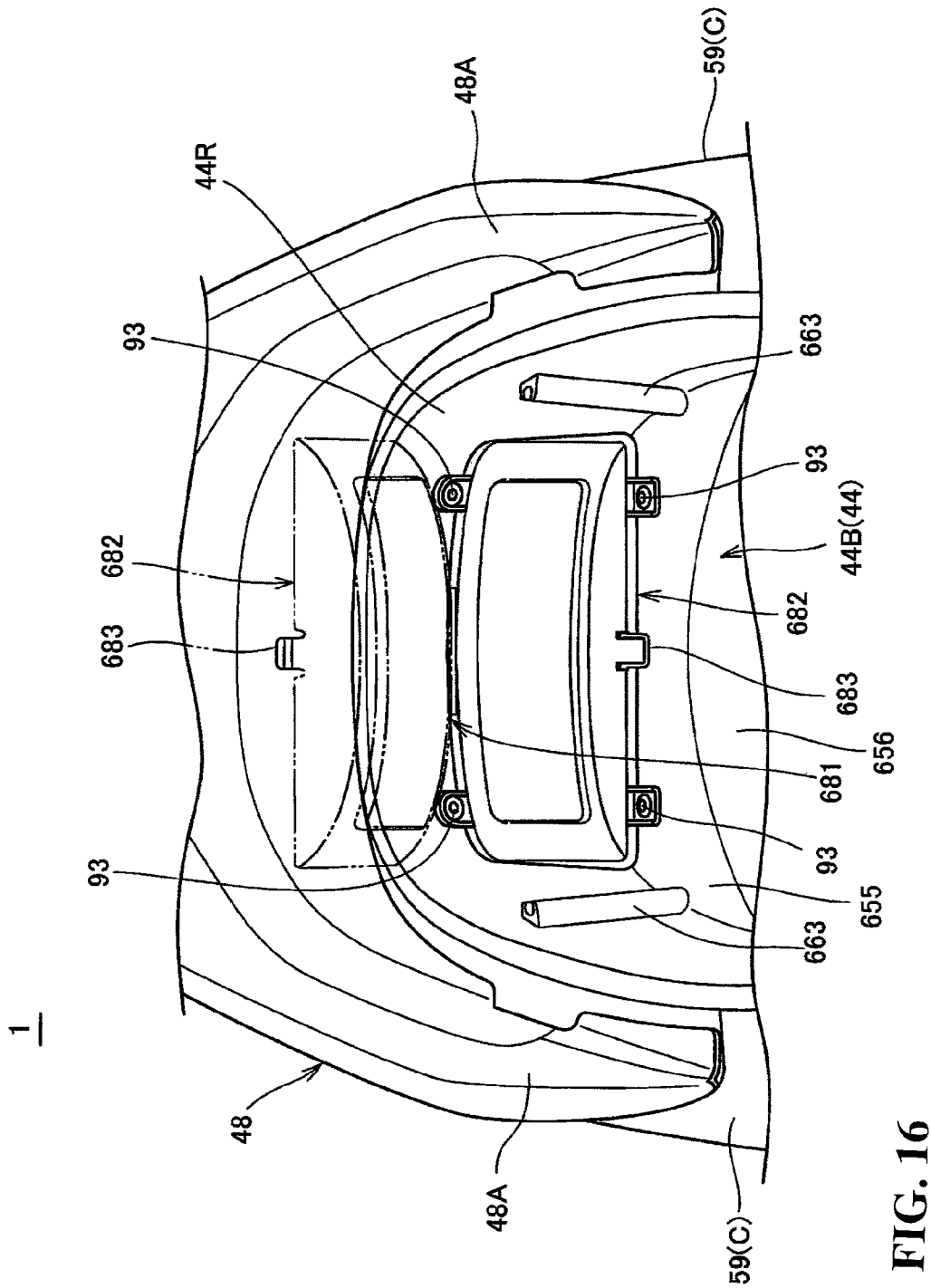
FIG. 16 is a perspective view of a rear portion of the accommodation box as viewed from obliquely upwardly.

FIG. 15 is a side elevational sectional view showing a rear portion of an accommodation box 44 of a motorcycle 1 according to a second embodiment together with peripheral components, and FIG. 16 is a perspective view of the rear portion of the accommodation box 44 as viewed from obliquely upwardly.

In the second embodiment, a lid member 682 is integrally formed at a front upper portion of the sub-accommodation box 671 through a hinge section 681 made of resin and having an axial line of pivotal motion in the vehicle widthwise direction. The lid member 682 is pivotally mounted upwardly and downwardly by the hinge section 681 such that the opening 44K of the sub-accommodation box 671 can be opened and closed by the lid member 682.

The lid member 682 is shaped such that it substantially covers a flange portion 673 that expands at a front portion of the box main body 672. When the lid member 682 covers the flange portion 673, a peripheral edge of the lid member 682 fits with a peripheral edge of the flange portion 673 to lock the lid member 682. A knob portion 683 for being gripped by a user is provided at a front lower portion of the lid member 682 such that an opening or closing operation can be carried out readily by the user gripping the knob portion 683.

Consequently, the sub-accommodation box 671 can be partitioned into an independent accommodation space, and the convenience in use as an accessory case can be improved further. Further, it is possible to configure the sub-accommodation box 671 for opening and closing movement without increasing the number of parts. Furthermore, since the lid member 682 is locked by fitting, the locking structure can be simplified to achieve a reduction in weight. Consequently, in addition to the various effects of the first embodiment, a sub-accommodation space that can be opened and closed by a simple configuration can be provided, and the convenience in use can be improved furthermore.

Figure 17:
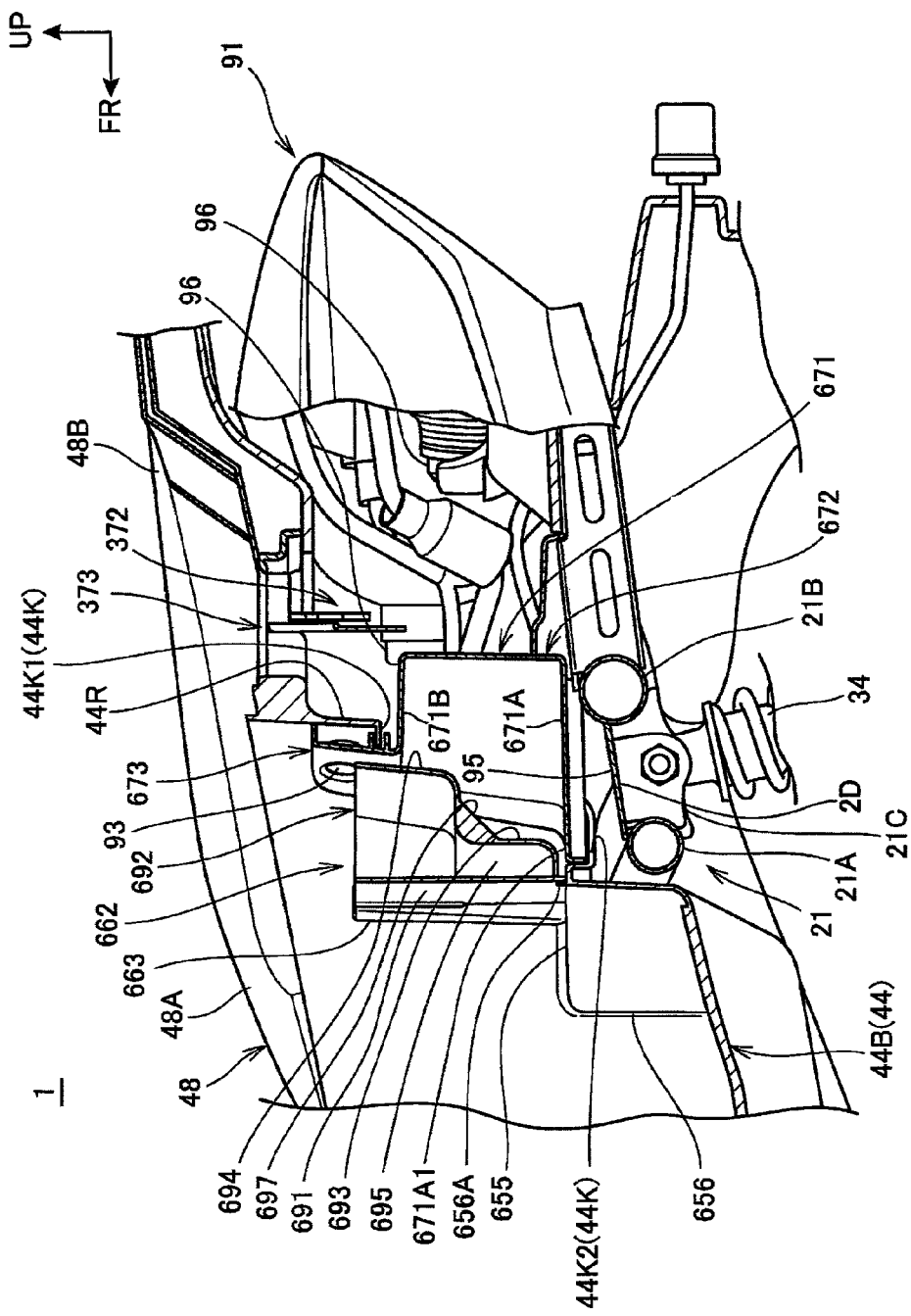
FIG. 17 is a side elevational sectional view showing a rear portion of an accommodation box of a motorcycle according to a third embodiment together with peripheral components.
Figure 18:
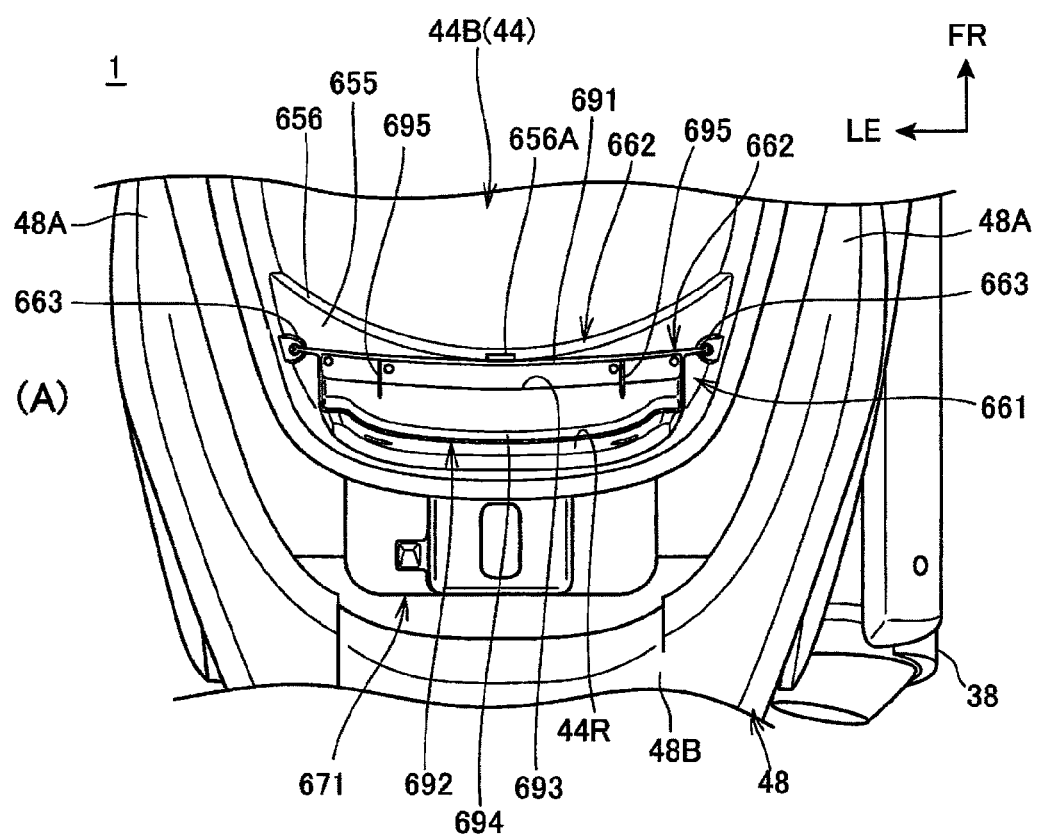
FIG. 18 is a view of the rear portion of the accommodation box as viewed from above.
Figure 19A:
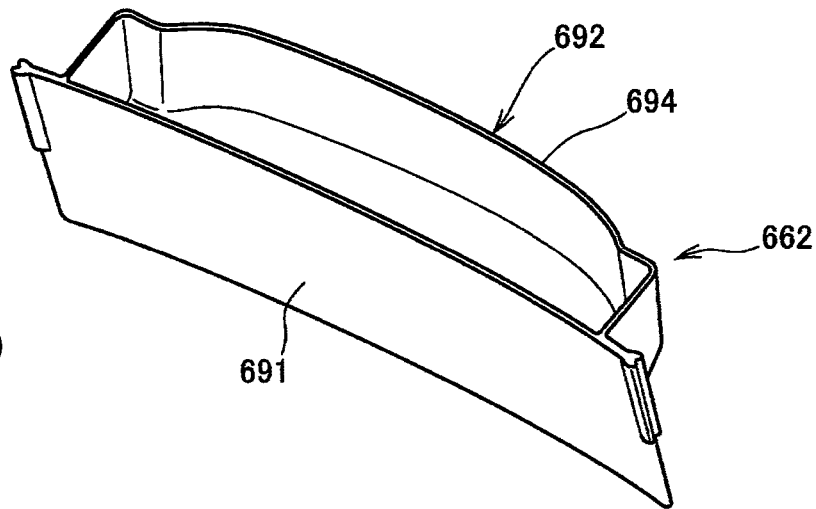
FIG. 19(A) is a view of a partition wall as viewed from a forward direction and upwardly.
Figure 19B:
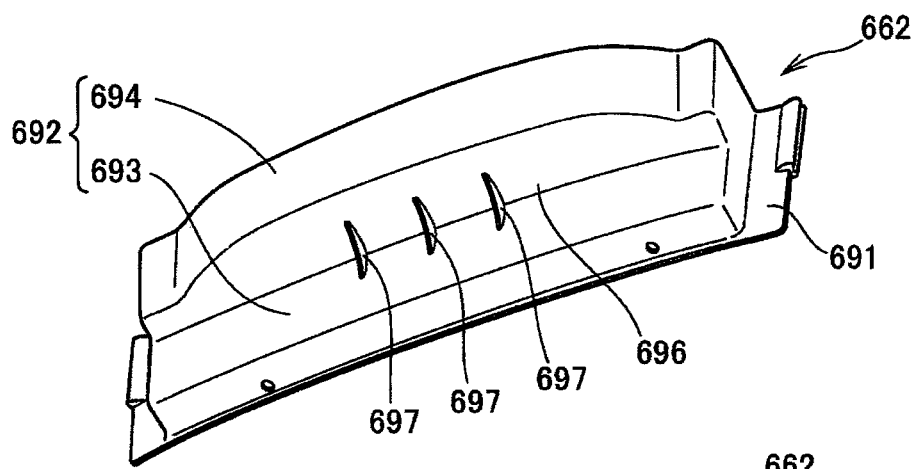
FIG. 19(B) is a view of the partition wall as viewed from rearwardly downwardly.
Figure 19C:
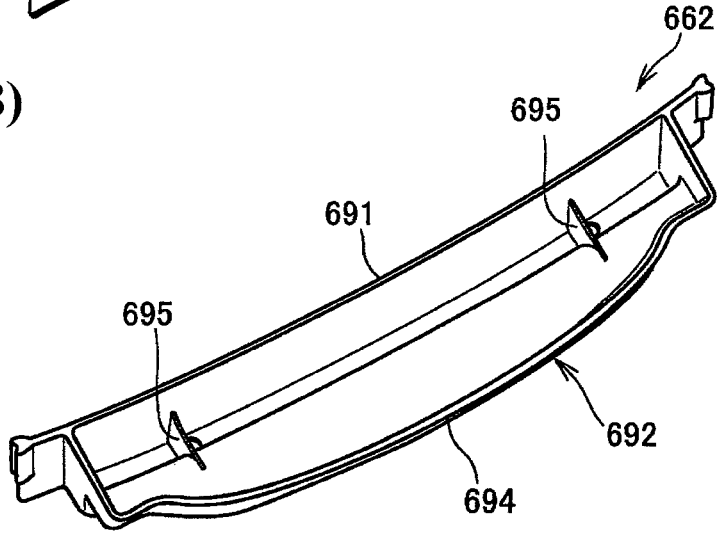
FIG. 19(C) is a perspective view of the partition wall as viewed substantially from above.

FIG. 17 is a side elevational sectional view showing a rear portion of an accommodation box 44 of a motorcycle 1 according to a third embodiment together with peripheral components, and FIG. 18 is a view of the rear portion of the accommodation box 44 as viewed from above. Further, FIG. 19(A) is a view of a partition wall 662 as viewed from a forward direction upwardly, FIG. 19(B) is a view of the partition wall 662 as viewed from rearwardly downwardly, and FIG. 19(C) is a perspective view as viewed substantially from above.

In the third embodiment, the partition wall 662 is formed in a bottomed configuration open upwardly and is configured as an accessory case into that accessories such as a document can be placed. In the following, the partition wall 662 is described in detail.

As shown in FIGS. 17 to 19, the partition wall 662 has a vertical plate portion 691 that can be taken into and out of left and right rails 663, 663 provided on left and right side walls of the accommodation box 44, and a bottomed box portion 692 swollen rearwardly from the vertical plate portion 691 and open upwardly. The vertical plate portion 691 and the bottomed box portion 692 are formed integrally by resin molding.

The vertical plate portion 691 is mounted on the left and right rails 663, 663 such that it is erected uprightly so as to extend in the vehicle widthwise direction in the accommodation box 44 in the proximity of a front edge of a raised bottom 655. Thus, the vertical plate portion 691 functions as a partition member upwardly continuous to the front edge of the raised bottom 655. The vertical plate portion 691 is positioned behind the front edge of the raised bottom 655 as viewed in top plan (refer to FIG. 18) and formed in a curved shape projecting rearwardly. Therefore, the vertical plate portion 691 can partition the accommodation space in front of the raised bottom 655 into an accommodation space that continues upwardly and downwardly and into and out of which an accommodation article can be readily taken.

As shown in FIGS. 17 and 18, an engaging pawl 656A for engaging with the vertical plate portion 691 of the partition wall 662 is provided integrally on a wall portion 656 that configures the front edge of the raised bottom 655. More particularly, the engaging pawl 656A projects upwardly farther than a bottom plate 671A of a sub-accommodation box 671 at a central portion in the vehicle widthwise direction of the wall portion 656 and engages with a front face of the vertical plate portion 691. Consequently, movement or deformation of the vertical plate portion 691 in the forward direction can be suppressed.

In this instance, since the partition wall 662 is positioned at three points by the left and right rails 663, 663 and the engaging pawl 656A, the supporting strength of the partition wall 662 can be efficiently raised.

As shown in FIG. 17 and FIGS. 19(A) and 19(B), the bottomed box portion 692 is swollen rearwardly by different amounts at upper and lower portions thereof with the lower half thereof being formed as a lower side swollen portion 693 that is swollen rearwardly in a spaced relationship by a fixed distance from the vertical plate portion 691. Meanwhile, the upper half of the bottomed box portion 692 is formed as an upper side swollen portion 694 that is swollen rearwardly in a spaced relationship from the vertical plate portion 691 by an amount greater than that of the lower side swollen portion 693.

When a small article that is thin (hereinafter referred to as thin small article) such as a document is placed into the bottomed box portion 692, the lower side swollen portion 693 can suppress forward or backward movement of the thin small article. Further, as shown in FIG. 19(C), also a pair of left and right vertical plates 695 for suppressing leftward or rightward movement of a thin small article placed in the lower side swollen portion 693 are provided integrally.

Since the upper side swollen portion 694 is an opening wider than that of the lower side swollen portion 693, a small article that is larger than a thin small article can be placed. Further, since a hand of a user can be put into the upper side swollen portion 694 readily, a small article placed in the lower side swollen portion 693 or the upper side swollen portion 694 can be taken out readily. Further, if a small article that cannot be taken out readily even if a hand of a user is put in such as, for example, a screw is placed, then it can be taken out readily by removing the partition wall 662 and tilting the accommodation box 44.

In this manner, also with the present embodiment, the partition wall 662 can be used as an accessory case that is good in convenience in use. Further, since the partition wall 662 is removably mounted, a small article entering the interior can be taken out readily by removing the accessory case.

Further, as shown in FIG. 19(B), a plurality of (three in the present embodiment) ribs 697 are formed integrally in a spaced relationship from each other in the vehicle widthwise direction on a stepped portion 696 formed between the lower side swollen portion 693 and the upper side swollen portion 694. The connection strength of the lower side swollen portion 693 and the upper side swollen portion 694 can be enhanced by the ribs 697. Further, the lower side swollen portion 693 is reinforced also by the paired left and right vertical plates 695 in the lower side swollen portion 693 described hereinabove. The strength of the partition wall 662 can be raised by them.

The embodiments described above show different modes of the present invention to the end and can be modified and applied arbitrarily without departing from the subject matter of the present invention. For example, while, in the embodiments described above, the present invention is applied to the accommodation structure for the motorcycle 1 shown in FIG. 1, the present invention may be applied to an accommodation structure for a saddle type vehicle including not only a motorcycle but also other two-wheeled vehicles and vehicles other than two-wheeled vehicles. It is to be noted that the saddle type vehicle includes general vehicles on which an occupant gets astride the vehicle body and includes not only a motorcycle (including a bicycle with a prime mover) but also three-wheeled vehicles and four-wheeled vehicles classified into ATVs (all terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An accommodation structure for a saddle vehicle comprising:
   an accommodation box open upwardly, said accommodation box (44) being provided below an occupant's seat (10) and opened and closed by the occupant's seat (10);
   an opening provided in a rear wall (44R) of the accommodation box (44); and
   a sub-accommodation section (671) being provided in the form of a box open in a forward direction and is mounted so as to close up the opening (44K) and be swollen rearwardly farther than the opening (44K).

2. The accommodation structure for a saddle vehicle according to claim 1, wherein a bottom plate (671A) of the sub-accommodation section (671) has a forwardly swollen portion (671A1) that is swollen forwardly farther than a top plate (671B) of the sub-accommodation section (671), and a cross member (21) of a vehicle body frame (F) passes below the forwardly swollen portion (671A1) and has an identification section (95) for the identification of the vehicle provided at a position thereof wherein the identification section (95) overlaps with the forwardly swollen portion as viewed in a top plan view of the vehicle body.

3. The accommodation structure for a saddle vehicle according to claim 1, wherein the cross member (21) connects left and right seat rails (14) to each other at a rearmost end of the vehicle body frame (F).

4. The accommodation structure for a saddle vehicle according to claim 2, wherein the cross member (21) connects left and right seat rails (14) to each other at a rearmost end of the vehicle body frame (F).

5. The accommodation structure for a saddle vehicle according to claim 1, wherein a rear lamp unit (91) is disposed and wiring lines connected to the rear lamp unit (91) are wired behind the sub-accommodation section (671).

6. The accommodation structure for a saddle vehicle according to claim 2, wherein a rear lamp unit (91) is disposed and wiring lines connected to the rear lamp unit (91) are wired behind the sub-accommodation section (671).

7. The accommodation structure for a saddle vehicle according to claim 3, wherein a rear lamp unit (91) is disposed and wiring lines connected to the rear lamp unit (91) are wired behind the sub-accommodation section (671).

8. The accommodation structure for a saddle vehicle according to claim 1, wherein a grab rail (48) configured from a pair of left and right arm portions (48A) extending in a forward direction and a connecting portion (48B) for connecting the arm portions (48A) to each other and having a U-shape open in the forward direction; and
   a fastening portion (314) to the vehicle body frame (F) is provided on the paired left and right arm portions (48A), and the connecting portion (48B) is disposed behind the sub-accommodation section (671) while a seat catch (372) for configuring a locking mechanism for the occupant's seat (10) is provided at a front portion of the connecting portion (48B).

9. The accommodation structure for a saddle vehicle according to claim 2, wherein a grab rail (48) configured from a pair of left and right arm portions (48A) extending in a forward direction and a connecting portion (48B) for connecting the arm portions (48A) to each other and having a U-shape open in the forward direction; and
   a fastening portion (314) to the vehicle body frame (F) is provided on the paired left and right arm portions (48A), and the connecting portion (48B) is disposed behind the sub-accommodation section (671) while a seat catch (372) for configuring a locking mechanism for the occupant's seat (10) is provided at a front portion of the connecting portion (48B).

10. The accommodation structure for a saddle vehicle according to claim 3, wherein a grab rail (48) configured from a pair of left and right arm portions (48A) extending in a forward direction and a connecting portion (48B) for connecting the arm portions (48A) to each other and having a U-shape open in the forward direction; and
    a fastening portion (314) to the vehicle body frame (F) is provided on the paired left and right arm portions (48A), and the connecting portion (48B) is disposed behind the sub-accommodation section (671) while a seat catch (372) for configuring a locking mechanism for the occupant's seat (10) is provided at a front portion of the connecting portion (48B).

11. The accommodation structure for a saddle vehicle according to claim 4, wherein a grab rail (48) configured from a pair of left and right arm portions (48A) extending in a forward direction and a connecting portion (48B) for connecting the arm portions (48A) to each other and having a U-shape open in the forward direction; and
    a fastening portion (314) to the vehicle body frame (F) is provided on the paired left and right arm portions (48A), and the connecting portion (48B) is disposed behind the sub-accommodation section (671) while a seat catch (372) for configuring a locking mechanism for the occupant's seat (10) is provided at a front portion of the connecting portion (48B).

12. The accommodation structure for a saddle vehicle according to claim 1, wherein a partition plate (662) is provided in front of the sub-accommodation section (671).

13. The accommodation structure for a saddle vehicle according to claim 2, wherein a partition plate (662) is provided in front of the sub-accommodation section (671).

14. The accommodation structure for a saddle vehicle according to claim 12, wherein the partition wall (662) is a bottomed accessory case open upwardly.

15. The accommodation structure for a saddle vehicle according to claim 1, wherein a lid member (682) that openably closes up a front opening of the sub-accommodation section (671) is connected to a front upper portion of the sub-accommodation section (671) by a hinge section (681).

16. The accommodation structure for a saddle vehicle according to claim 2, wherein a lid member (682) that openably closes up a front opening of the sub-accommodation section (671) is connected to a front upper portion of the sub-accommodation section (6710 by a hinge section (681).

17. An accommodation structure for a saddle vehicle comprising:
- an occupant's seat (10) movably mounted relative to the saddle vehicle;
- an accommodation box (44) secured to the saddle vehicle, said accommodation box (44) including an opening (44K) with said accommodation box (44) being provided below the occupant's seat (10), the opening (44K) of said accommodation box (44) being opened and closed by the occupant's seat (10);
- an opening (44K) provided in a rear wall (44R) of the accommodation box (44); and
- a sub-accommodation section (671) being provided in the form of a box open in a forward direction, said sub-accommodation section (671) being mounted so as to close up the opening (44K) of the accommodation box (44) and extends rearwardly farther than the opening (44K) of the accommodation box (44).

18. The accommodation structure for a saddle vehicle according to claim 17, wherein a bottom plate (671A) of the sub-accommodation section (671) has a forwardly extending portion (671A1) that extends forwardly farther than a top plate (671B) of the sub-accommodation section (671), and a cross member (21) of a vehicle body frame (F) passes below the forwardly extending portion (671A1) and has an identification section (95) for the identification of the vehicle provided at a position thereof wherein the identification section (95) overlaps with the forwardly extending portion as viewed in a top plan view of the vehicle body.

19. The accommodation structure for a saddle vehicle according to claim 17, wherein the cross member (21) connects left and right seat rails (14) to each other at a rearmost end of the vehicle body frame (F).

20. The accommodation structure for a saddle vehicle according to claim 17, wherein a rear lamp unit (91) is disposed and wiring lines connected to the rear lamp unit (91) are wired behind the sub-accommodation section (671).

* * * * *